United States Patent
Liao et al.

(10) Patent No.: US 12,439,053 B2
(45) Date of Patent: Oct. 7, 2025

(54) METHOD, APPARATUS, AND NON-TRANSITORY COMPUTER-READABLE STORAGE MEDIUM FOR MOTION VECTOR REFINEMENT FOR GEOMETRIC PARTITION MODE

(71) Applicant: Alibaba (China) Co., Ltd., Zhejiang (CN)

(72) Inventors: Ru-Ling Liao, San Mateo, CA (US); Yan Ye, San Mateo, CA (US); Xinwei Li, San Mateo, CA (US); Jie Chen, San Mateo, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/465,832

(22) Filed: Sep. 12, 2023

(65) Prior Publication Data
US 2024/0007647 A1    Jan. 4, 2024

Related U.S. Application Data

(63) Continuation of application No. 17/658,378, filed on Apr. 7, 2022, now Pat. No. 11,876,973.
(Continued)

(51) Int. Cl.
*H04N 19/119* (2014.01)
*H04N 19/132* (2014.01)
(Continued)

(52) U.S. Cl.
CPC ......... *H04N 19/139* (2014.11); *H04N 19/119* (2014.11); *H04N 19/132* (2014.11); *H04N 19/157* (2014.11)

(58) Field of Classification Search
CPC .. H04N 19/139; H04N 19/543; H04N 19/157; H04N 19/176; H04N 19/132; H04N 19/119
See application file for complete search history.

(56) References Cited

U.S. PATENT DOCUMENTS

| | | | |
|---|---|---|---|
| 11,595,642 B2* | 2/2023 | Jang | H04N 19/186 |
| 2020/0177873 A1* | 6/2020 | Li | H04N 19/593 |

(Continued)

FOREIGN PATENT DOCUMENTS

| | | |
|---|---|---|
| CN | 111052744 A | 4/2020 |
| CN | 111147847 A | 5/2020 |
| WO | WO2020159982 A1 | 8/2020 |

OTHER PUBLICATIONS

"Requirements for a Future Video Coding Standard v5," International Organisation for Standardisation, Torino, IT, 14 pages (2017).
(Continued)

*Primary Examiner* — Tsion B Owens
(74) *Attorney, Agent, or Firm* — Finnegan, Henderson, Farabow, Garrett & Dunner, LLP

(57) ABSTRACT

A method, an apparatus and non-transitory computer-readable storage medium for video data process are provided. The method includes receiving a bitstream comprising a coding unit coded in a geometric partition mode (GPM); decoding a first parameter associated with the coding unit, the first parameter indicating whether template matching being applied to the coding unit; and determining, according to the first parameter, motion information for the coding unit, wherein when the first parameter indicates the template matching is applied to the coding unit, the motion information is refined using the template matching.

14 Claims, 44 Drawing Sheets

Related U.S. Application Data

(60) Provisional application No. 63/215,519, filed on Jun. 27, 2021, provisional application No. 63/194,260, filed on May 28, 2021, provisional application No. 63/173,540, filed on Apr. 12, 2021.

(51) Int. Cl.
   *H04N 19/139* (2014.01)
   *H04N 19/157* (2014.01)

(56) References Cited

U.S. PATENT DOCUMENTS

| | | | | |
|---|---|---|---|---|
| 2020/0374528 | A1* | 11/2020 | Huang | H04N 19/176 |
| 2020/0413089 | A1 | 12/2020 | Liao et al. | |
| 2021/0006787 | A1 | 1/2021 | Zhang et al. | |
| 2022/0116645 | A1* | 4/2022 | Jang | H04N 19/119 |
| 2022/0295089 | A1* | 9/2022 | Zhang | H04N 19/52 |
| 2023/0217016 | A1* | 7/2023 | Filippov | H04N 19/176 375/240.02 |
| 2023/0319271 | A1* | 10/2023 | Lim | H04N 19/96 375/240.02 |
| 2024/0205425 | A1* | 6/2024 | Zhang | H04N 19/105 |

OTHER PUBLICATIONS

Chang et al., "Compression efficiency methods beyond VVC," JVET-U0100, 21$^{st}$ Meeting, by teleconference, Jan. 6-15, 2021, 13 pages.
Chen et al., "Algorithm Description of Joint Exploration Test Model 7 (JEM 7)," JVET-G1001-v1, 7$^{th}$ Meeting: Torino, IT, Jul. 13-21, 2017, 50 pages.
Chen et al., "Algorithm description for Versatile Video Coding and Test Model 11 (VTM 11)," JVET-T2002-v1, 20$^{th}$ meeting by teleconference, Oct. 7-16, 2020, 104 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
Sullivan et al., "Overview of the High Efficiency Video Coding (HEVC) Standard," IEE Transactions on Circuits and Systems for Video Technology, vol. 22, No. 12, pp. 1649-1668 (2012).
Jem, https://Jvet.hhi.fraunhofer.de/svn/svn_HMJEMSoftware.
PCT International Search Report and Written Opinion mailed Jul. 7, 2022, issued in corresponding International Application No. PCT/CN2022/086106 (6 pgs.).
Liao et al., "EE2-related: Combination of GPM and template matching," JVET-V0117, 22nd Meeting, by teleconference, Apr. 20-28, 2021, 2 pages.
European Patent Office Communication issued for Application No. 22787482.3 the Supplementary European Search Report (Art. 153(7) EPC) and the European search opinion dated Jan. 30, 2025, 8 pages.

* cited by examiner

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

FIG. 16

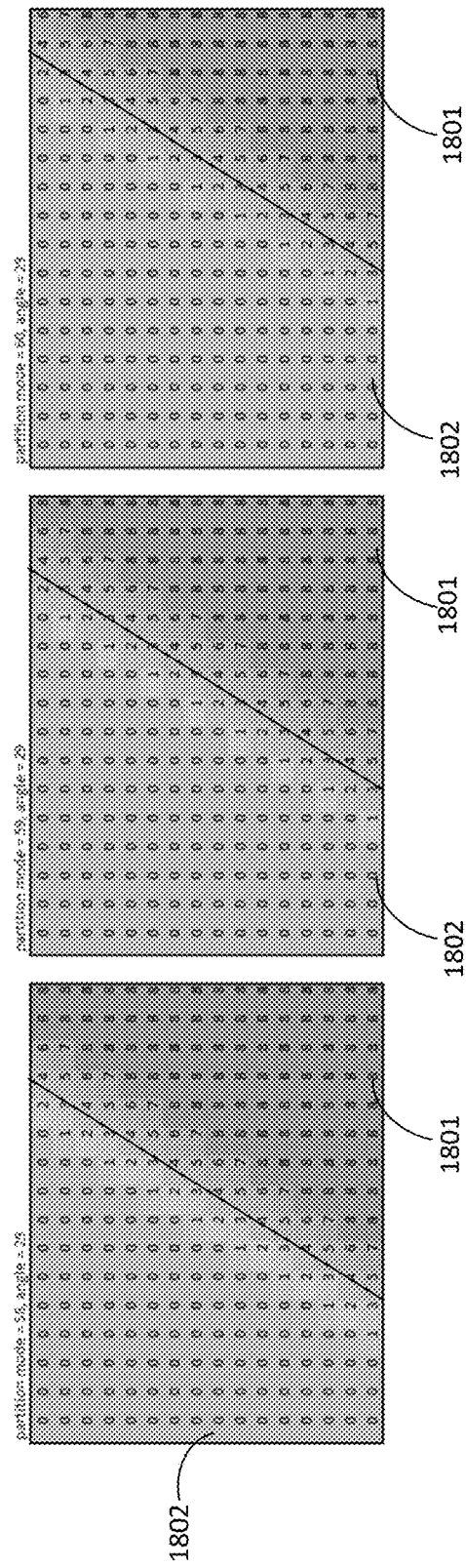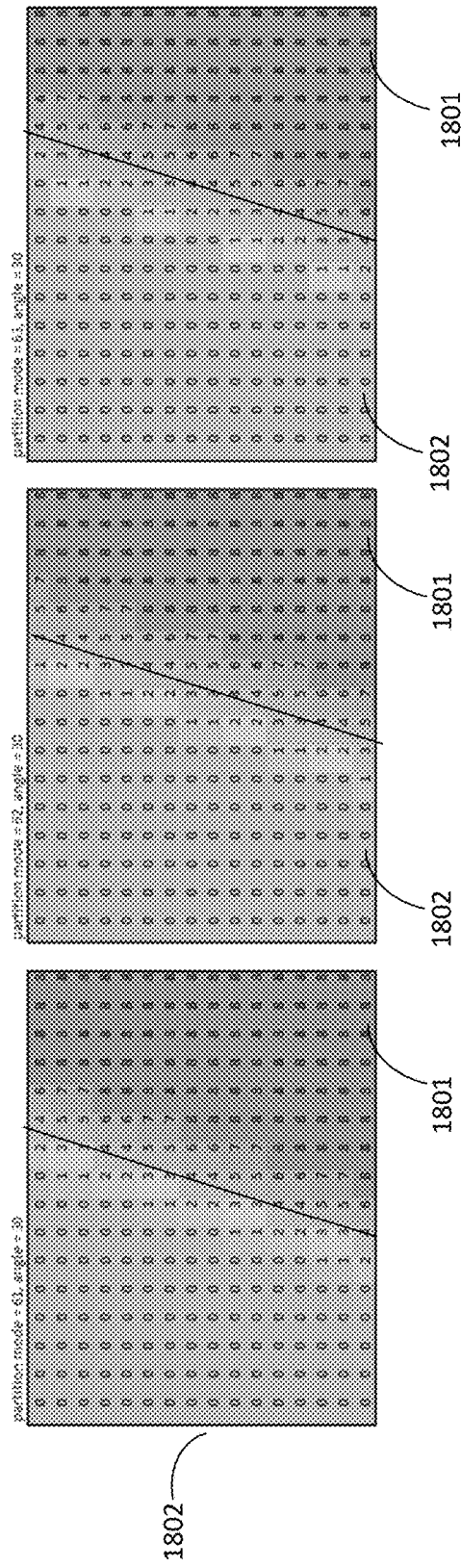
FIG. 18S        FIG. 18T

METHOD, APPARATUS, AND NON-TRANSITORY COMPUTER-READABLE STORAGE MEDIUM FOR MOTION VECTOR REFINEMENT FOR GEOMETRIC PARTITION MODE

CROSS-REFERENCE TO RELATED APPLICATIONS

The present disclosure is a continuation of U.S. application Ser. No. 17/658,378, filed Apr. 7, 2022, which claims the benefits of priority to U.S. Provisional Application No. 63/173,540, filed on Apr. 12, 2021, U.S. Provisional Application No. 63/194,260, filed on May 28, 2021, and U.S. Provisional Application No. 63/215,519, filed on Jun. 27, 2021, all of which are incorporated herein by reference in their entireties.

TECHNICAL FIELD

The present disclosure generally relates to video processing, and more particularly, to methods and systems for motion vector refinement for geometric partition mode.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for video data processing. The method includes receiving a bitstream comprising a coding unit coded in a geometric partition mode (GPM); decoding a first parameter associated with the coding unit, the first parameter indicating whether template matching being applied to the coding unit; and determining, according to the first parameter, motion information for the coding unit, wherein when the first parameter indicates the template matching is applied to the coding unit, the motion information is refined using the template matching.

Embodiments of the present disclosure provide an apparatus for performing video data processing. The apparatus includes a memory configured to store instructions; and one or more processors configured to execute the instructions to cause the apparatus to perform: receiving a bitstream comprising a coding unit coded in a geometric partition mode (GPM); decoding a first parameter associated with the coding unit, the first parameter indicating whether template matching being applied to the coding unit; and determining, according to the first parameter, motion information for the coding unit, wherein when the first parameter indicates the template matching is applied to the coding unit, the motion information is refined using the template matching.

Embodiments of the present disclosure provide a non-transitory computer-readable storage medium that stores a set of instructions that is executable by one or more processors of an apparatus to cause the apparatus to initiate a method for performing video data processing, the method includes receiving a bitstream comprising a coding unit coded in a geometric partition mode (GPM); decoding a first parameter associated with the coding unit, the first parameter indicating whether template matching being applied to the coding unit; and determining, according to the first parameter, motion information for the coding unit, wherein when the first parameter indicates the template matching is applied to the coding unit, the motion information is refined using the template matching.

BRIEF DESCRIPTION OF THE DRAWINGS

Embodiments and various aspects of the present disclosure are illustrated in the following detailed description and the accompanying figures. Various features shown in the figures are not drawn to scale.

FIG. 16 illustrates an exemplary relationship between GPM partition modes and GPM partition angles, according to some embodiments of the present disclosure.

DETAILED DESCRIPTION

Figure 1:
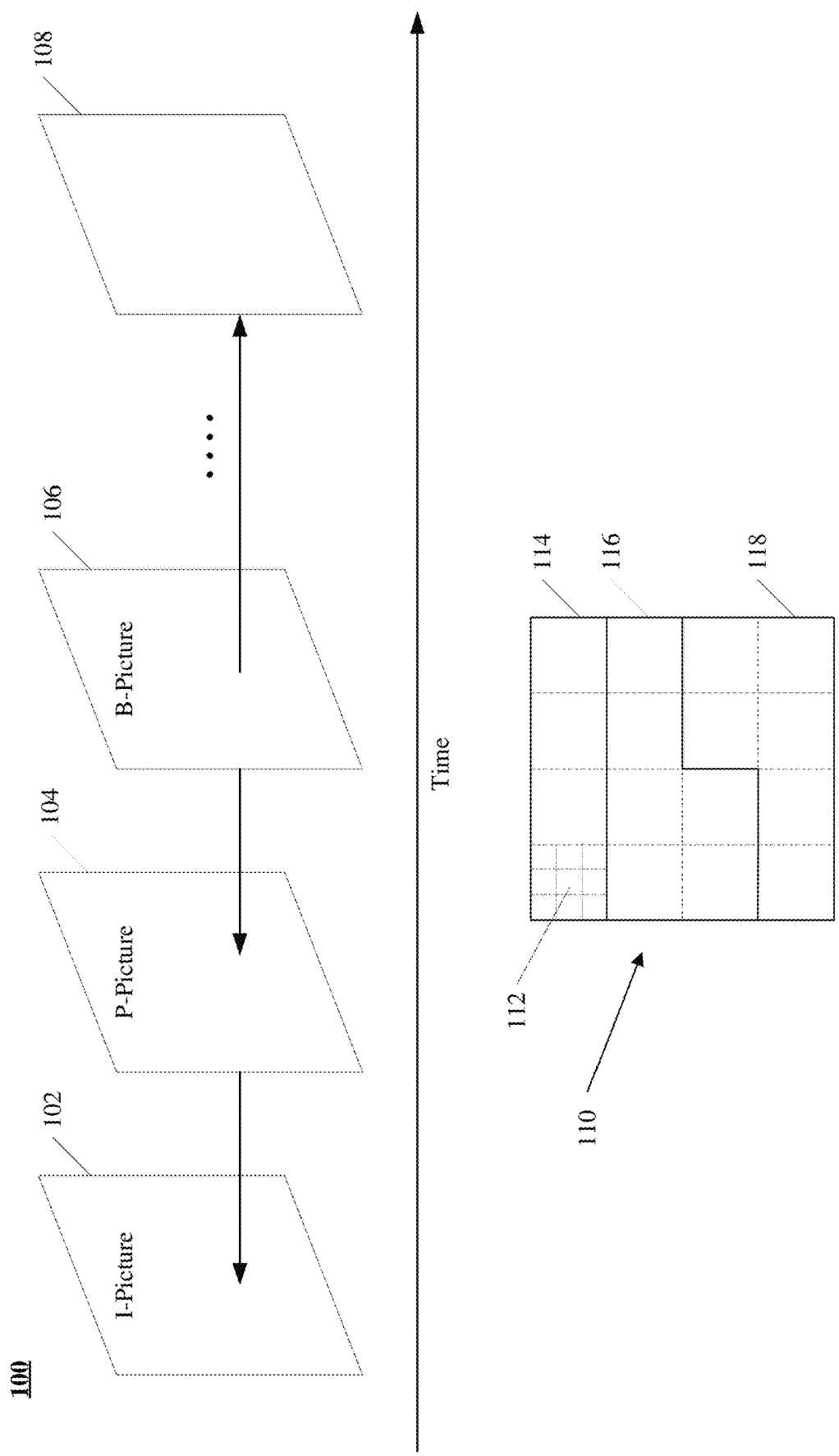
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In July 2020, the Versatile Video Coding (VVC/H.266) standard, which is developed by the Joint Video Experts Team (WET) of the ITU-T Video Coding Expert Group (ITU-T VCEG) and the ISO/IEC Moving Picture Expert Group (ISO/IEC MPEG), is finalized and is published as an international standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

After the VVC standard finalized, the JVET starts exploring new coding tools to further improve the coding performance of the VVC standard. In January 2021, the Enhanced Compression Model (ECM) has been proposed and been used as new software base for developing tools beyond the VVC standard.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
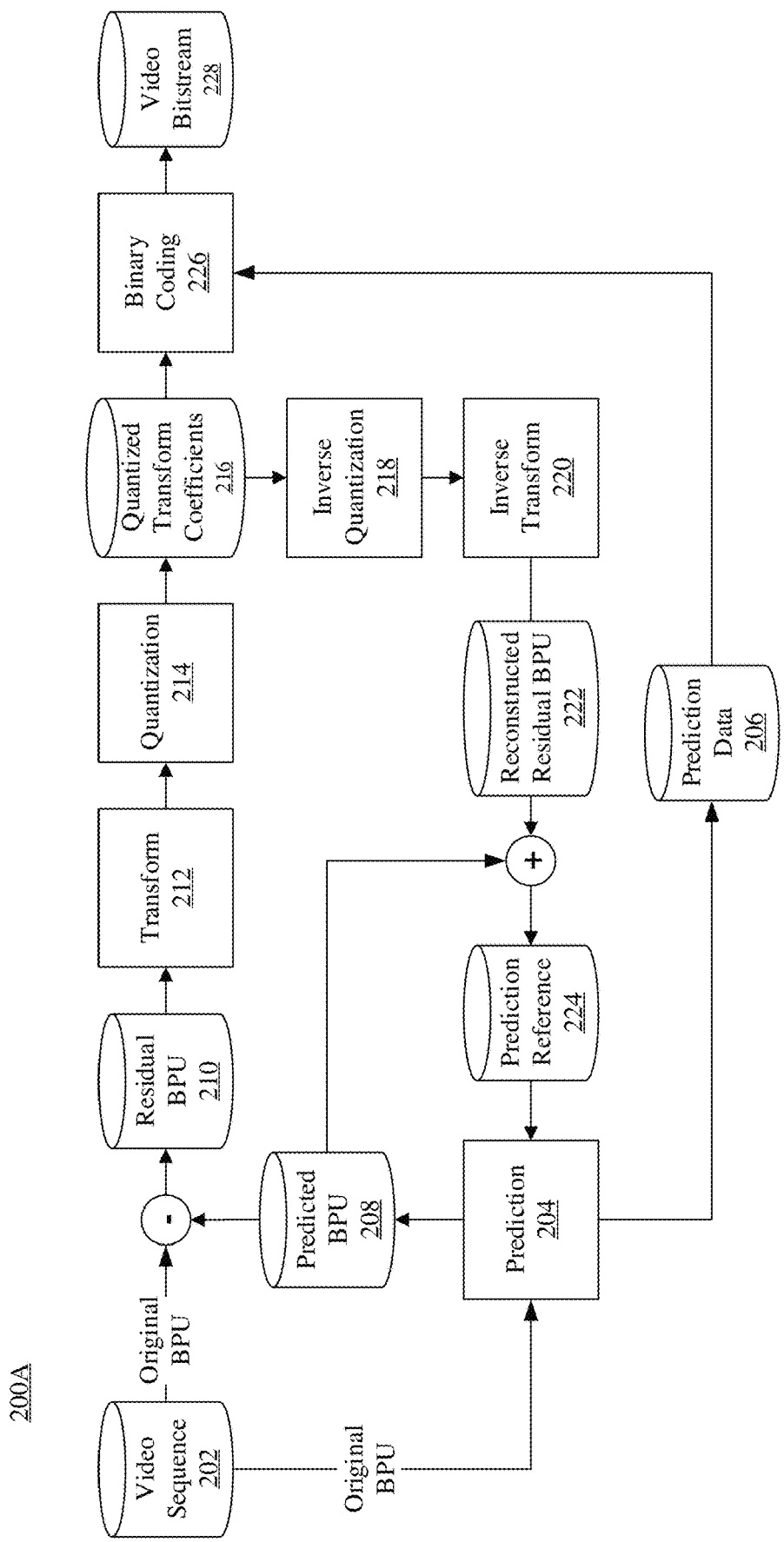
FIG. 2A is a schematic diagram illustrating an exemplary encoding process of a hybrid video coding system, consistent with embodiments of the disclosure.
Figure 2B:
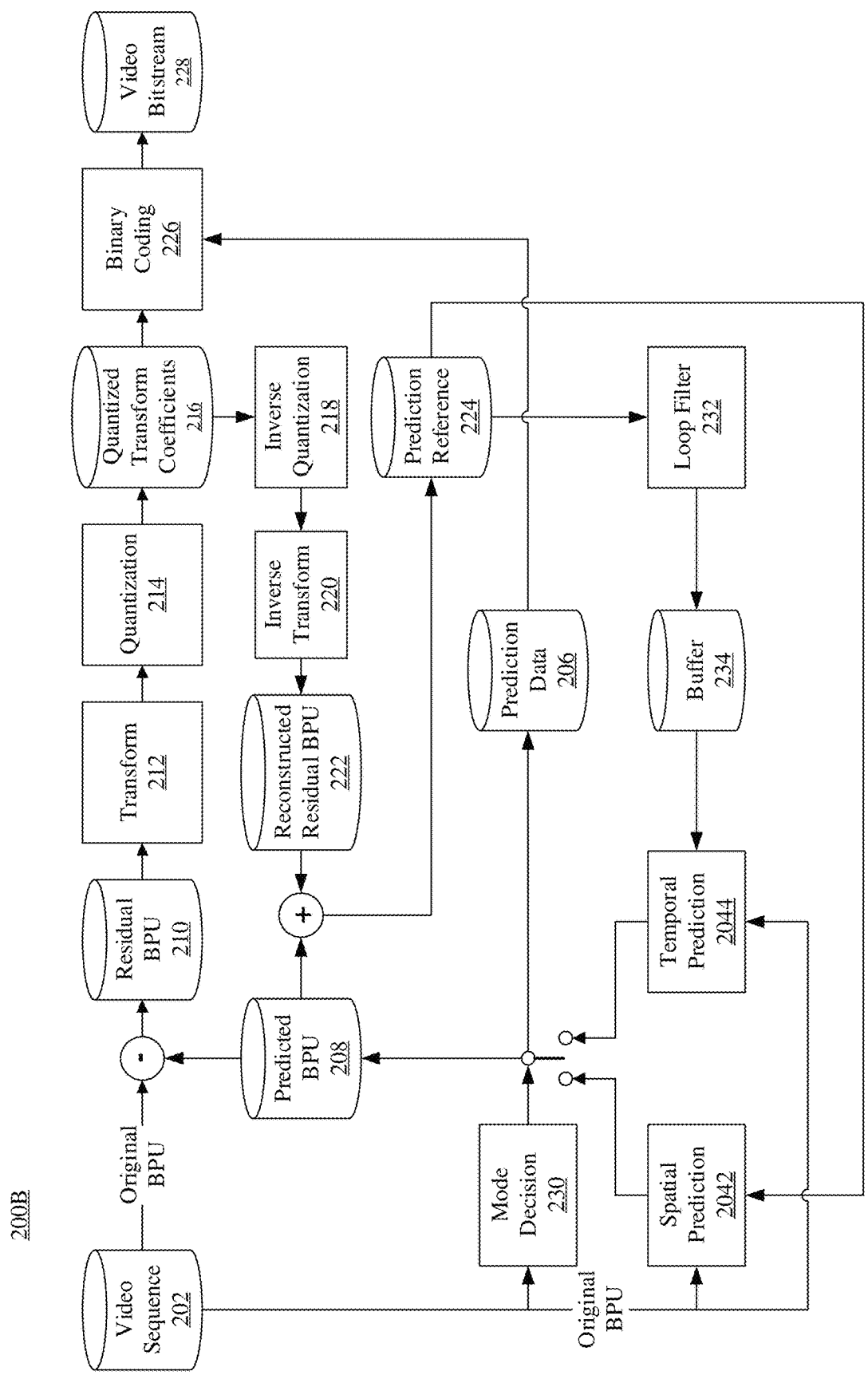
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PB s" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TB s" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to pre-dicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
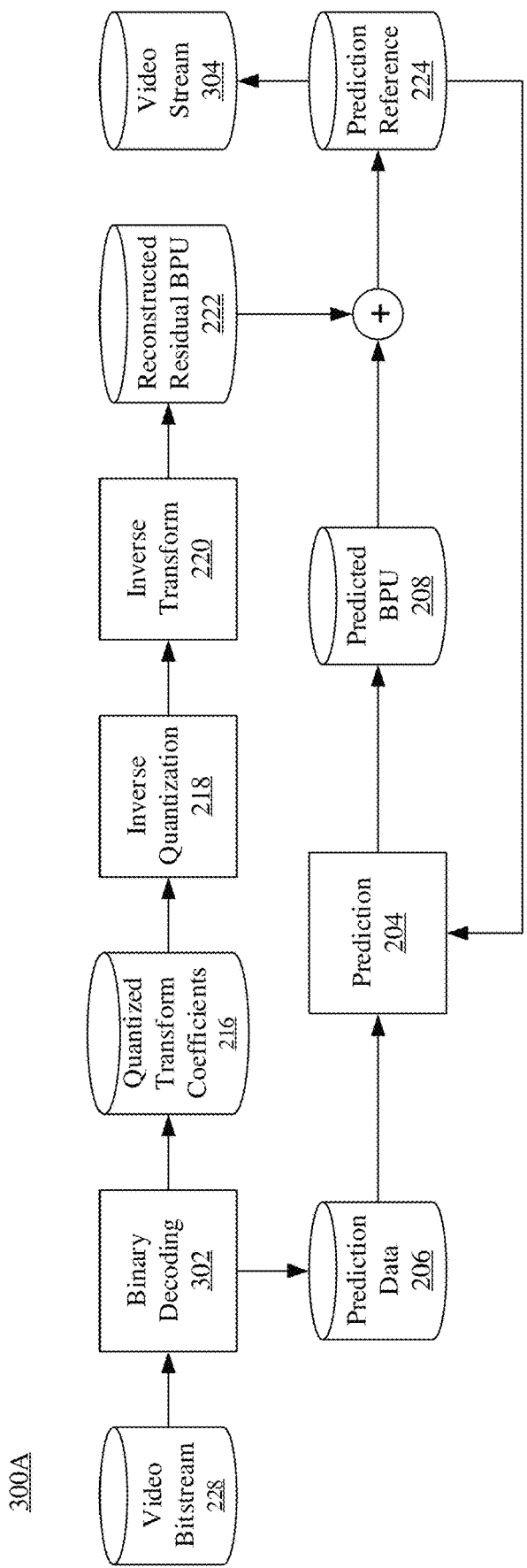
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
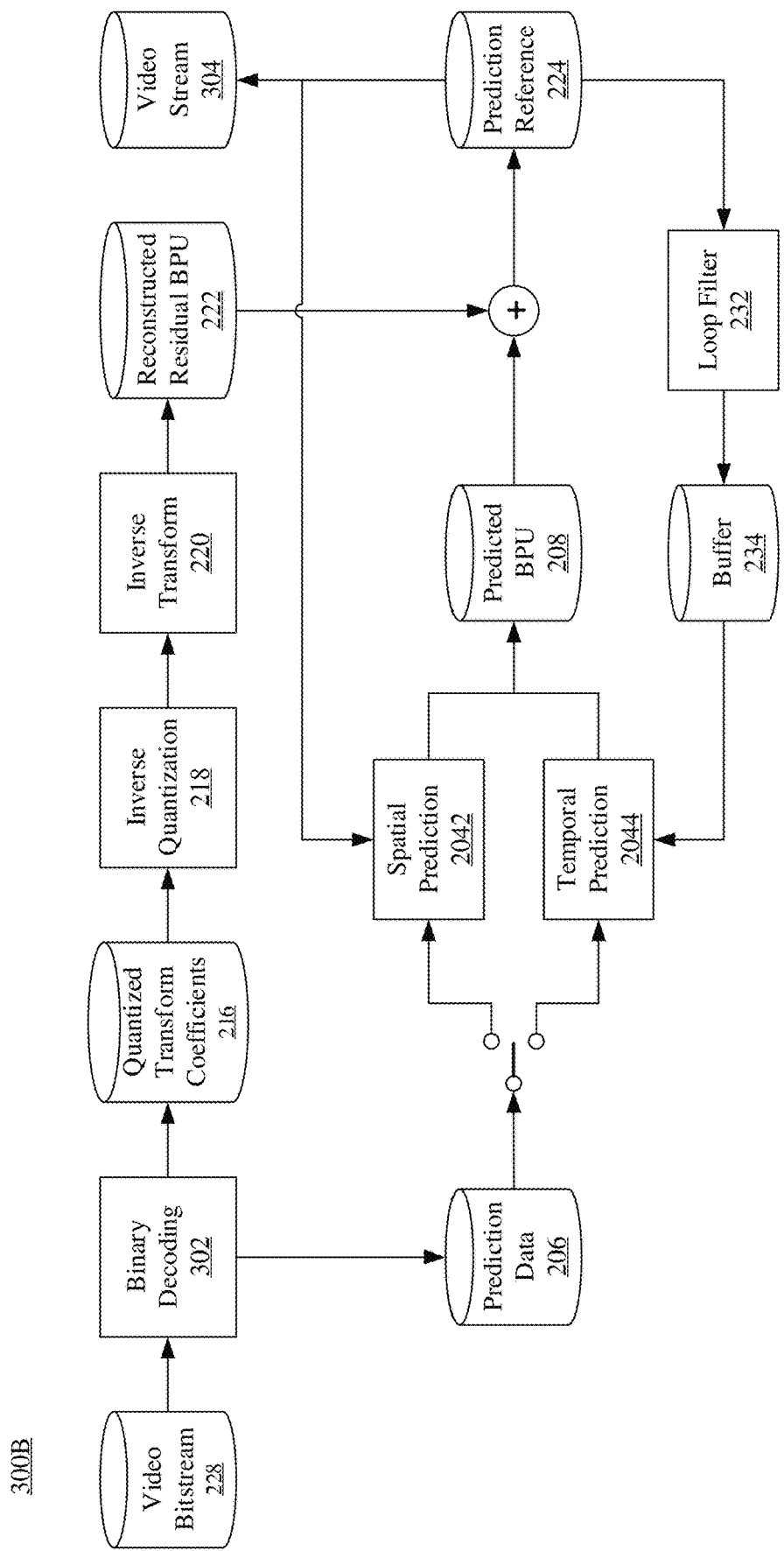
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
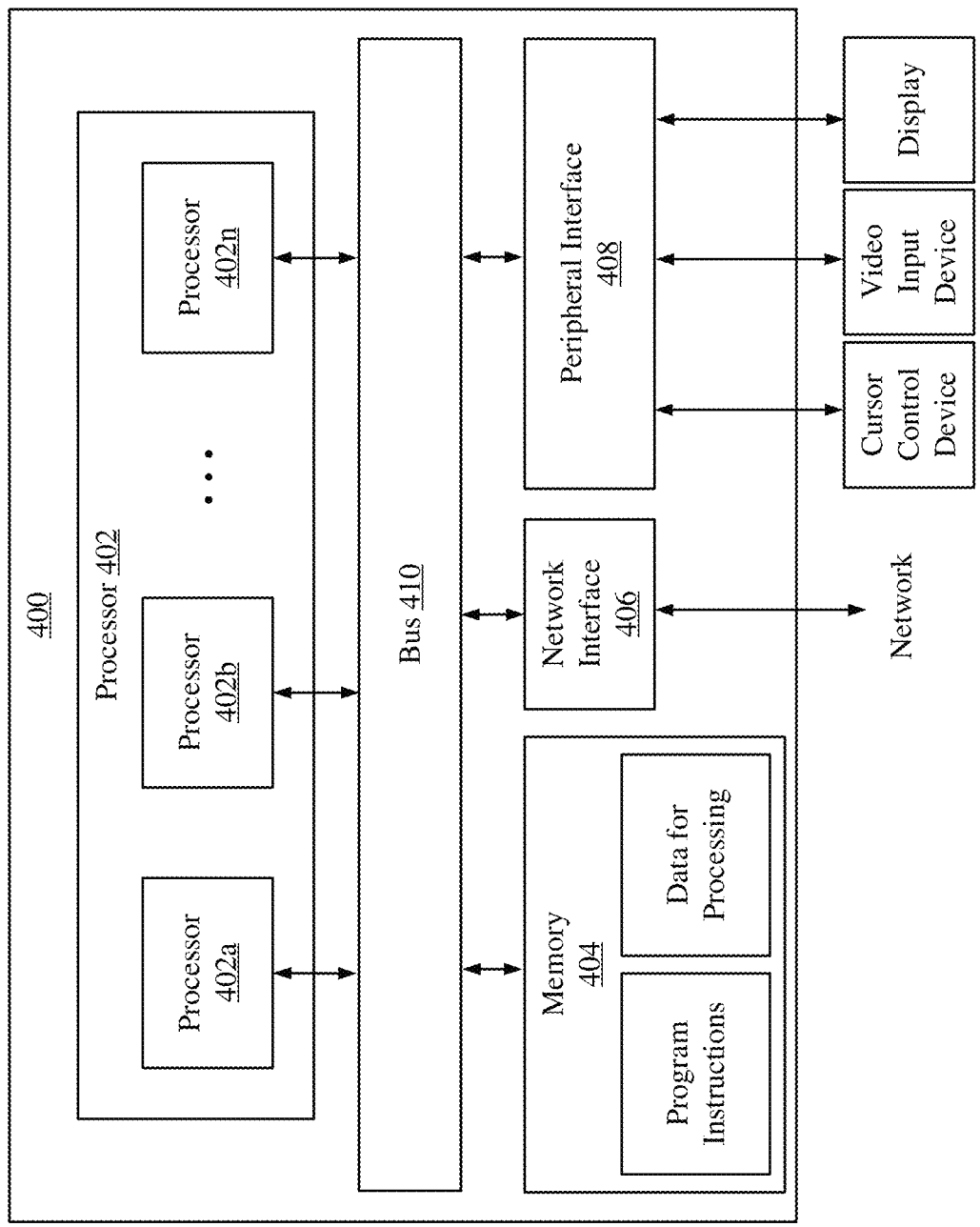
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The present disclosure provides methods for performing motion vector refinement for geometric partition mode.

In VVC, a geometric partitioning mode (GPM) is supported for inter prediction. The GPM is signaled using a CU-level flag as a kind of merge mode, together with other merge modes such as the regular merge mode, the merge mode with motion vector difference (MMVD) mode, the combined inter-intra prediction (CIIP) mode, and the sub-block merge mode. In total, 64 partitions are supported by the GPM for each possible CU size w×h=$2^m$×$2^n$, where m, n∈{3 . . . 6} excluding 8×64 and 64×8.

Figure 5:
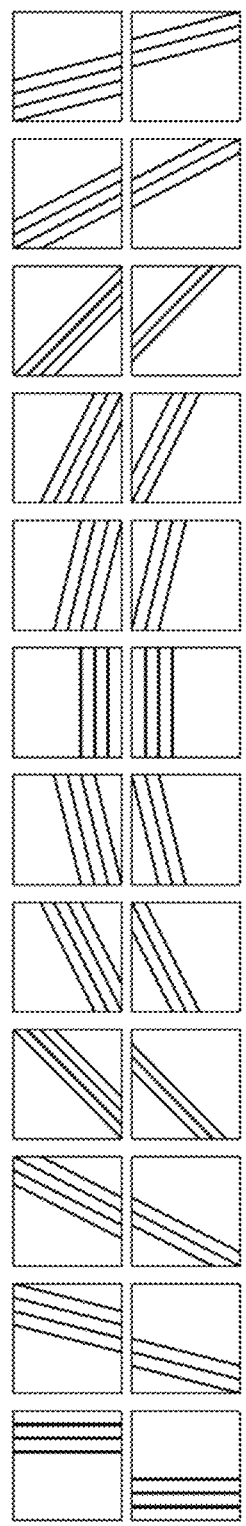
FIG. 5 illustrates exemplary geometric partition mode (GPM) splits grouped by identical angles, according to some embodiments of the present disclosure.

When GPM is used, a CU is split into two parts by a geometrically located straight line. FIG. 5 illustrates exemplary geometric partition mode (GPM) splits grouped by identical angles, according to some embodiments of the present disclosure. As shown in FIG. 5, a location of the splitting line is mathematically derived from an angle and offset parameters of a specific partition. Each part of a geometric partition in the CU is inter-predicted using its own motion, and only uni-prediction is allowed for each partition. That is, each part has one motion vector and one reference index. The uni-prediction motion constraint is applied to ensure only two motion compensated prediction are needed for each CU, which is the same as the conventional bi-prediction. The uni-prediction motion for each partition is derived using the uni-prediction candidate list construction process which is described in more detail below.

If GPM is used for a current CU, a prediction signal for the whole CU is described as follows. A geometric partition index indicating the partition mode of the geometric partition (an angle and offsets) is signaled. Then two merge indices (one for each partition) are further signaled. The number of maximum GPM candidate size is signaled explicitly in SPS and specifies syntax binarization for GPM merge indices. After predicting each of part of the geometric partition, sample values along the geometric partition edge are adjusted using a blending processing with adaptive weights, which is described in more detail below. Transform and quantization process applied to the whole CU will be the same as the process applied in other prediction modes. Finally, the motion field of a CU predicted using the GPM is stored. The detailed process for motion field storage for GPM is described in more detail below.

Figure 6:
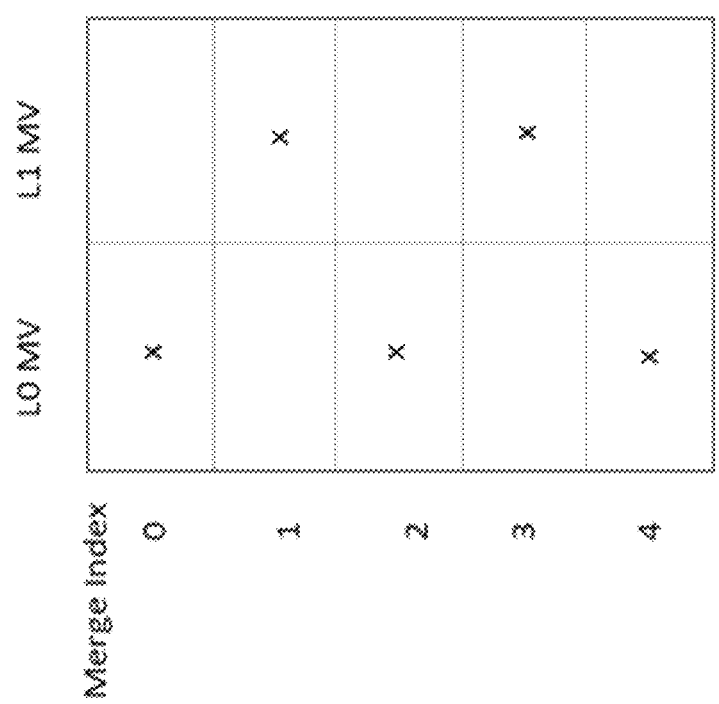
FIG. 6 illustrates an exemplary uni-prediction motion vector (MV) selection process for geometric partitioning mode, according to some embodiments of the present disclosure.

Details of the uni-prediction candidate list construction process are described as follows. The uni-prediction candidate list is derived directly from the merge candidate list constructed for regular merge mode. Denote n as the index of the uni-prediction motion in the geometric uni-prediction candidate list. The motion vector of the n-th extended merge candidate, noted as LX (where X equals to a parity of n), is used as the n-th uni-prediction motion vector for geometric partitioning mode. FIG. 6 illustrates an exemplary uni-prediction motion vector (MV) selection process for geometric partitioning mode, according to some embodiments of the present disclosure. As shown in FIG. 6, the motion vectors are marked with "x". In case a corresponding LX motion vector of the n-th extended merge candidate does not exist, the L(1−X) motion vector of the same candidate is used instead as the uni-prediction motion vector for GPM As to the process for blending along the geometric partitioning edge, after predicting each part of a geometric partition using its own motion, blending is applied to the two prediction signals of each part to derive samples around geometric partition edge. The blending weights for each position of the CU are derived based on a distance between individual position and the partition edge.

Figure 7:
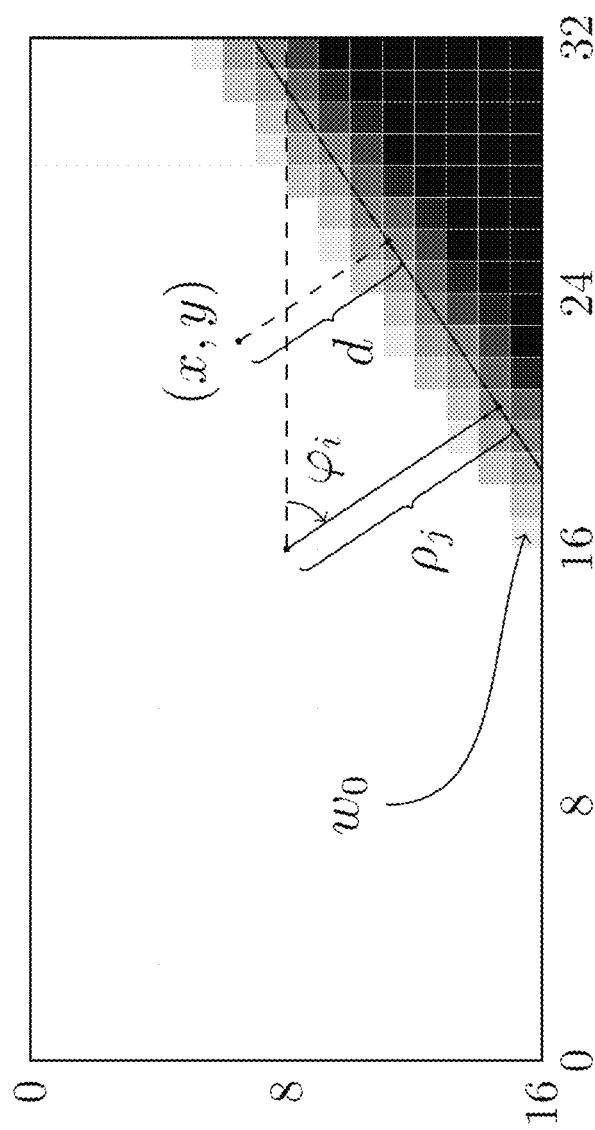
FIG. 7 illustrates exemplary generation of a bending weight $w_0$ using geometric partitioning mode, according to some embodiments of the present disclosure.

FIG. 7 illustrates exemplary generation of a bending weight $w_0$ using geometric partitioning mode, according to some embodiments of the present disclosure. As shown in FIG. 7, a distance for a position (x, y) to the partition edge is derived as:

$$d(x, y) = (2x + 1 - w)\cos(\varphi_i) + (2y + 1 - h)\sin(\varphi_i) - \rho_j \quad (1)$$

$$\rho_j = \rho_{x,j}\cos(\varphi_i) + \rho_{y,j}\sin(\varphi_i) \quad (2)$$

$$\rho_{x,j} = \begin{cases} 0 & i\ \%16 = 8\ \text{or}\ (i\ \%16 \neq 0\ \text{and}\ h \geq w) \\ \pm(j \times w) \gg 2 & \text{otherwise} \end{cases} \quad (3)$$

$$\rho_{y,j} = \begin{cases} \pm(j \times h) \gg 2 & i\ \%16 = 8\ \text{or}\ (i\ \%16 \neq 0\ \text{and}\ h \geq w) \\ 0 & \text{otherwise} \end{cases} \quad (4)$$

where i,j are indices for angle and offset of a geometric partition, respectively, which depend on the signaled geometric partition index. The signs of $\rho_{x,j}$ and $\rho_{y,j}$ depend on angle index i. w is a width of the CU, and h is a height of the CU.

The weights for each part of a geometric partition are derived as following:

$$wIdxL(x, y) = partIdx\ ?\ 32 + d(x, y) : 32 - d(x, y) \quad (5)$$

$$w_0(x, y) = \frac{Clip3(0,\ 8,\ (wIdxL(x, y) + 4) \gg 3)}{8} \quad (6)$$

$$w_1(x, y) = 1 - w_0(x, y) \quad (7)$$

where wIdxL (x, y) is an intermediate value for deriving the weights, $w_0(x, y)$ and $w_1(x, y)$ indicate corresponding weights for each partition respectively. The partIdx depends on the angle index i.

Regarding field storage for GPM, MV1 from a first part of the geometric partition, MV2 from a second part of the geometric partition and a combined MV of MV1 and MV2 are stored in the motion filed of a GPM coded CU.

A stored motion vector type for each individual position in the motion filed are determined as:

$$sType = abs(motionIdx) < 32\ ?\ 2 : (motionIdx \leq 0\ ?\ (1 - partIdx) : partIdx) \quad (8)$$

where motionIdx is equal to d(4x+2, 4y+2), which is recalculated from equation (1). The partIdx depends on the angle index i.

If sType is equal to 0 or 1, MV1 or MV2 are stored in the corresponding motion field; otherwise, if sType is equal to 2, a combined MV from MV1 and MV2 are stored. The combined MV is generated using the following process: (1) if MV1 and MV2 are from different reference picture lists (one from L0 and the other from L1), then MV1 and MV2 are simply combined to form the bi-prediction motion vectors; (2) otherwise, if MV1 and MV2 are from the same list, only uni-prediction motion MV2 is stored.

Similar to GPM in VVC, one tool called angular weighted prediction (AWP) is adopted in Audio Video coding Standard 3 (AVS3). AVS3 video standard is developed by AVS Workgroup which was founded in 2002 in China. The predecessor of AVS3 standard, AVS1 and AVS2 were issued as China national standard in the year of 2006 and 2016, respectively. In AVS3, an AWP mode is supported for skip and direct mode. The AWP mode is signaled using a CU-level flag as one kind of skip or direct mode. In the AWP mode, a motion vector candidate list, which contains five different uni-prediction motion vectors, is constructed by deriving motion vectors from spatial neighboring blocks and temporal motion vector predictor. Then, two uni-prediction motion vectors are selected from the motion vector candidate list to predict the current block. Unlike the bi-prediction inter mode that has equal weights for all samples, each sample coded in AWP mode may have different weights. The weight for each sample is predicted from a weight array which has values from 0 to 8.

Figure 8:
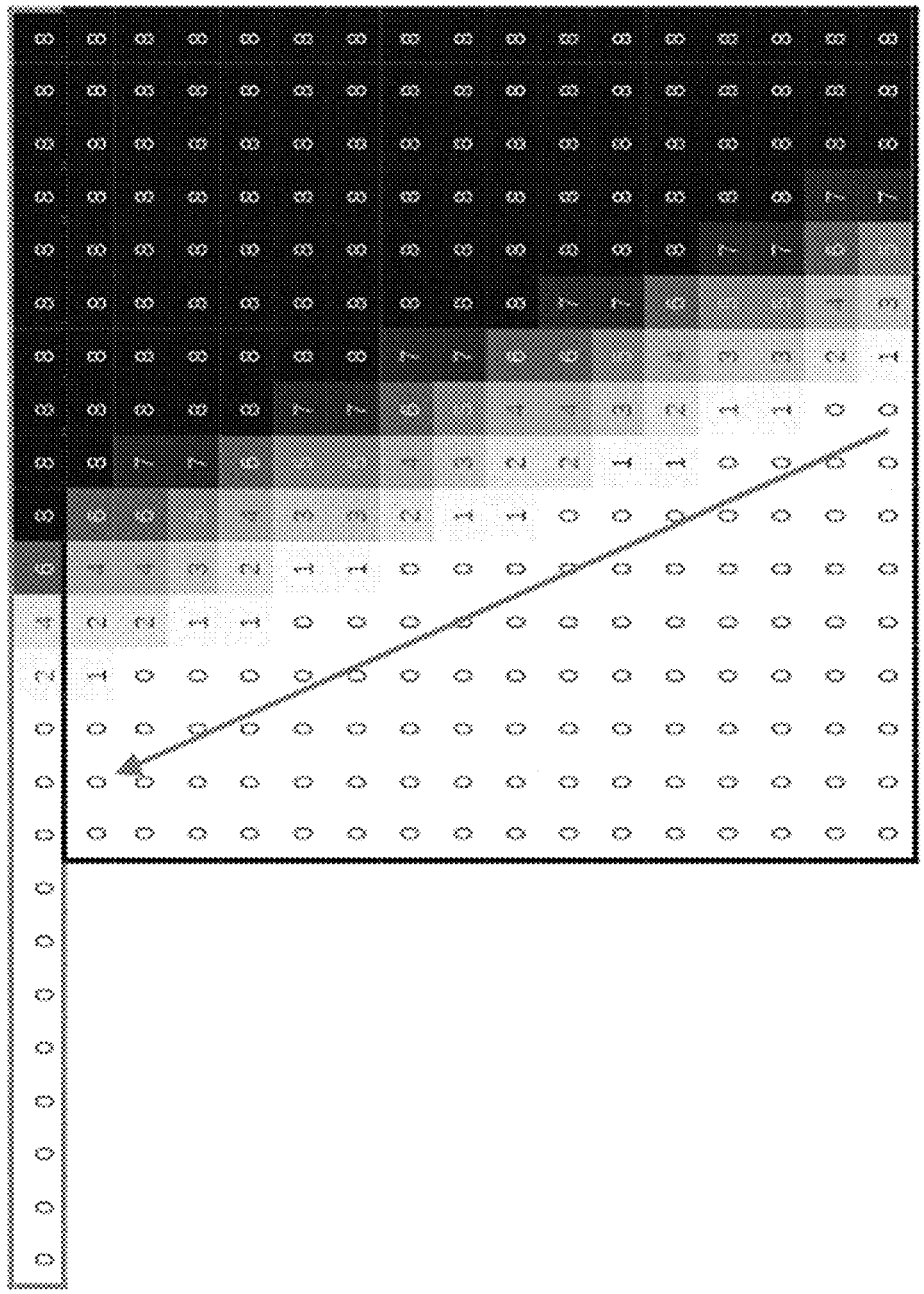
FIG. 8 illustrates an exemplary process for angular weighted prediction (AWP) weight prediction, according to some embodiments of the present disclosure.
Figure 9:
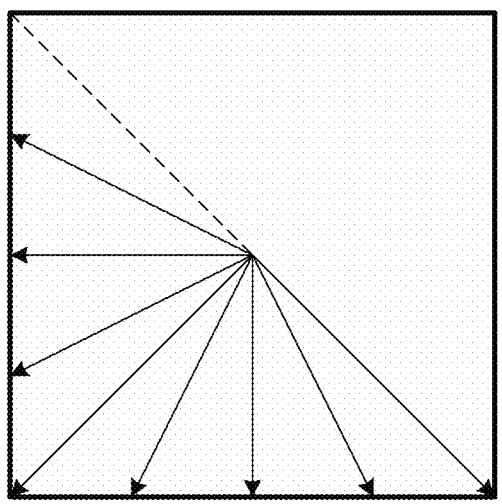
FIG. 9 illustrates eight exemplary intra prediction angles supported in the AWP mode, according to some embodiments of the present disclosure.
Figure 10:
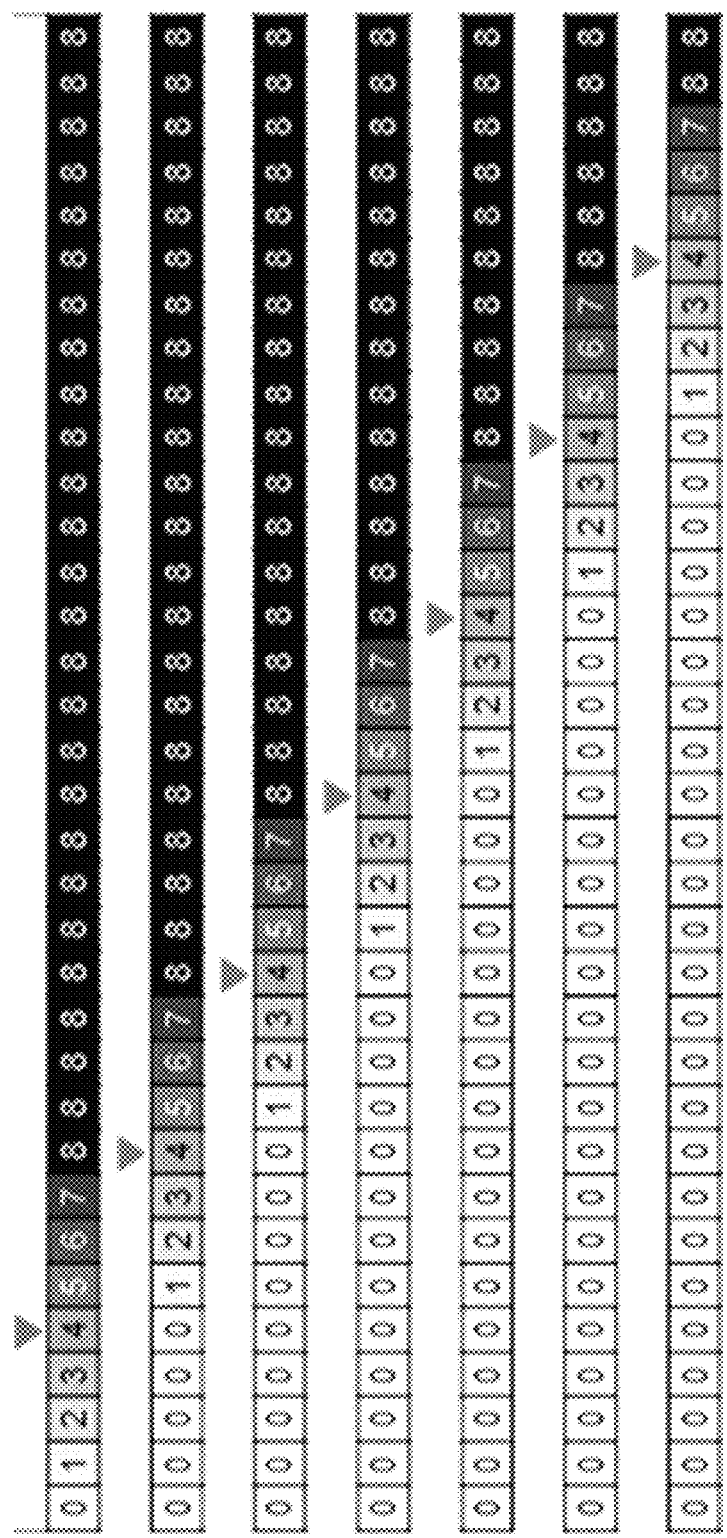
FIG. 10 illustrates seven different exemplary weight array settings in the AWP mode, according to some embodiments of the present disclosure.

FIG. 8 illustrates an exemplary process for angular weighted prediction (AWP) weight prediction, according to some embodiments of the present disclosure. FIG. 9 illustrates eight exemplary intra prediction angles supported in the AWP mode, according to some embodiments of the present disclosure. FIG. 10 illustrates seven different exemplary weight array settings in the AWP mode, according to some embodiments of the present disclosure. As shown in FIG. 8, the angular weight prediction is similar to the process of intra prediction mode. In total, 56 different kinds of weights are supported by AWP mode for each possible CU size w×h=$2^m \times 2^n$ with m, n $\in \{3 \ldots 6\}$, including 8 intra prediction angles (shown in FIG. 9) and 7 different weight array settings (shown in FIG. 10). It is noted that the AWP mode is directly signaled to decoder without prediction. The AWP mode index is binarized using truncated binary. That is, index 0 to 7 are coded using 5 bits and index 8 to 55 are coded using 6 bits.

Assuming that the two selected uni-prediction motion vectors are MV1 and MV2. Two prediction blocks, P0 and P1, are obtained by performing motion compensation using MV1 and MV2, respectively. The final prediction block P is calculated as follows:

$$P = (P0 \times w0 + P1 \times (8 - w0)) \gg 3 \quad (9)$$

where the w0 is the weight matrix derived by the aforementioned weight prediction method.

After prediction, the uni-prediction motion vectors are stored in 4×4 granularity. For each 4×4 unit, one of two uni-prediction motion vector is stored.

Figure 11:
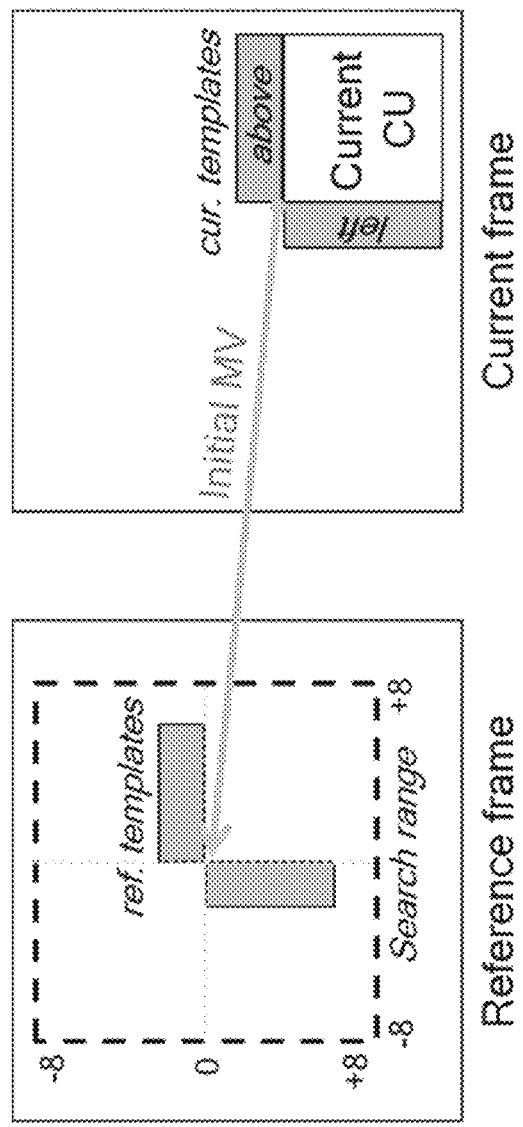
FIG. 11 illustrates template matching performed on a search area around an initial MV, according to some embodiments of the present disclosure.

Template matching (TM) is a decoder-side MV derivation method to refine the motion information of the current CU by finding the closest match between a template (e.g., top and/or left neighboring blocks of the current CU) in the current picture and a block (e.g., same size to the template) in a reference picture. FIG. 11 illustrates template matching performed on a search area around an initial MV, according to some embodiments of the present disclosure. As shown in FIG. 11, a better MV is searched around the initial motion of the current CU within a [−8, +8]-pel search range. The TM mode can be applied to merge mode and AMVP mode.

When applying to merge mode, a merge candidate indicated by the signaled merge index is used as initial motion. The search method shown in Table 1 is performed to refine the motion. TM can perform all the way down to ⅛-pel MVD precision or skip those beyond half-pel MVD precision, depending on whether the alternative interpolation filter (that is used when AMVR is of half-pel mode) is used according to merged motion information.

TABLE 1

Search patterns of AMVR and merge mode with AMVR

| Search pattern | AMVR mode | | | | Merge mode | |
| --- | --- | --- | --- | --- | --- | --- |
| | 4-pel | Full-pel | Half-pel | Quarter-pel | AltIF = 0 | AltIF = 1 |
| 4-pel diamond | v | | | | | |
| 4-pel cross | v | | | | | |
| Full-pel diamond | | v | v | v | v | v |
| Full-pel cross | | v | v | v | v | v |
| Half-pel cross | | | v | v | v | v |
| Quarter-pel cross | | | | v | v | |
| 1/8-pel cross | | | | | v | |

In AMVP mode, an MVP candidate is determined based on template matching error to pick up the one which reaches the minimum difference between current block template and reference block template, and then TM performs only for this particular MVP candidate for MV refinement. TM refines this MVP candidate, starting from full-pel MVD precision (or 4-pel for 4-pel AMVR mode) within a [−8, +8]-pel search range by using iterative diamond search. The AMVP candidate may be further refined by using cross search with full-pel MVD precision (or 4-pel for 4-pel AMVR mode), followed sequentially by half-pel and quarter-pel ones depending on AMVR mode as specified in Table 1. This search process ensures that the MVP candidate still keep the same MV precision as indicated by AMVR mode after TM process.

Merge mode with motion vector differences (MMVD) which signals MVD for a merge candidate is introduced in VVC. An MMVD flag is signaled right after sending a regular merge flag to specify whether MMVD mode is used for a CU. In MMVD, after a merge candidate is selected, it is further refined by the signaled MVDs information. The further information includes a merge candidate flag, an index to specify motion magnitude, and an index for indication of motion direction. In MMVD mode, one of the first two candidates in the merge list is selected to be used as MV basis. The MMVD candidate flag is signaled to specify which one is used between the first and second merge candidates.

A distance index specifies motion magnitude information and indicates the pre-defined offset from the starting point. In MMVD mode, an offset is added to either the horizontal component or the vertical component of the starting MV. The relation of the distance index and the pre-defined offset is specified in the following Table 2.

TABLE 2

The relation of distance index and pre-defined offset

| | Distance IDX | | | | | | | |
| --- | --- | --- | --- | --- | --- | --- | --- | --- |
| | 0 | 1 | 2 | 3 | 4 | 5 | 6 | 7 |
| Offset (in unit of luma sample) | 1/4 | 1/2 | 1 | 2 | 4 | 8 | 16 | 32 |

The direction index represents the direction of the MVD relative to the starting point. The direction index can represent the four directions as shown in the following table. It's noted that the meaning of MVD sign could be varied according to the information of starting MVs. When the starting MV(s) is a uni-prediction MV or bi-prediction MVs with both lists pointing to the same side of the current picture (e.g., picture order counts (POCs) of two references are both larger than the POC of the current picture, or are both smaller than the POC of the current picture), the sign in the following table specifies the sign of MV offset added to the starting MV. When the starting MVs are bi-prediction MVs with the two MVs pointing to the different sides of the current picture (e.g., the POC of one reference is larger than the POC of the current picture, and the POC of the other reference is smaller than the POC of the current picture), and the difference of POC in list 0 is greater than the one in list 1, the sign in the following table specifies the sign of MV offset added to the list0 MV component of starting MV and the sign for the list1 MV has the opposite value. Otherwise, if the difference of POC in list 1 is greater than list 0, the sign in the following table specifies the sign of MV offset added to the list 1 MV component of starting MV and the sign for the list 0 MV has opposite value.

TABLE 3

Sign of MV offset specified by direction index

| Direction IDX | 00 | 01 | 10 | 11 |
| --- | --- | --- | --- | --- |
| x-axis | + | − | N/A | N/A |
| y-axis | N/A | N/A | + | − |

Recently, MMVD is proposed to be applied to GPM. When a CU coded using GPM mode, each geometric partition is free to select whether its motion is refined by a signaled MVD information. Two additional flags are signaled to indicate whether the MMVD is applied to the two geometric partitions, respectively. It is noted that to enable more flexible combinations of MV refinements for two GPM partitions, the following conditions may be applied to the two selected MVs of the two GPM partitions:
  a. When both the first and second GPM partitions do not apply MV refinement, the two selected MVs of two GPM partitions are disallowed to be identical.
  b. When one of the two GPM partitions applies the MV refinement and the other does not, the two selected MVs of the two GPM partitions are allowed to be identical.
  c. When both of the two GPM partitions apply the MV refinement, the two selected MVs are allowed to be the same when the MV refinements of the two partitions are different, and disallowed to be the same when the two MV refinements are identical.

The TM mode refines motion at decoder side without signaling motion vector differences. However, it is only applied to regular merge mode, rather than GPM. Therefore, GPM cannot benefit from the TM mode that could provide more precise motion prediction for either or both of the GPM partitions.

In this disclosure, a method for applying the template matching to the GPM to refine the motion is proposed.

Figure 12:
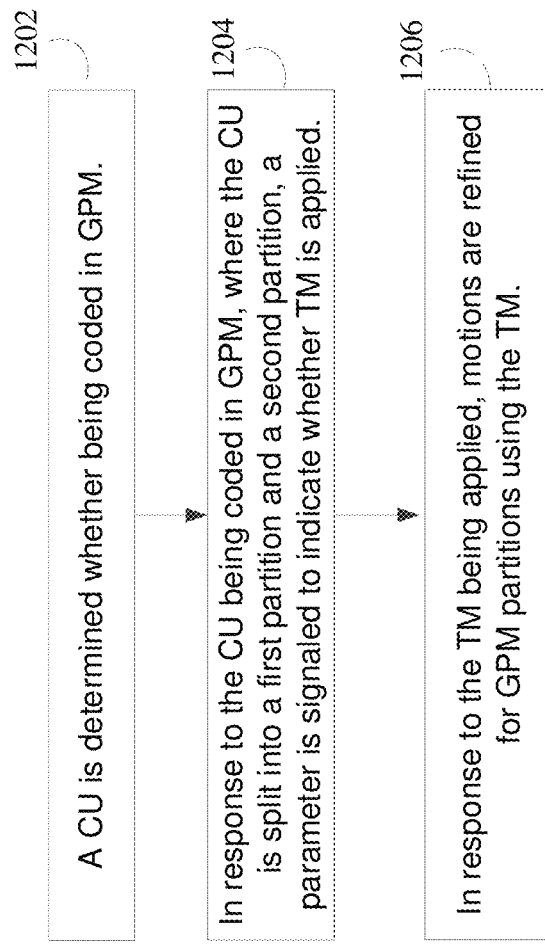
FIG. 12 illustrates an exemplary flow chart of a method for applying template matching to GPM to refine motion, according to some embodiments of the present disclosure.

FIG. 12 illustrates an exemplary flow chart of a method 1200 for applying template matching to GPM to refine the motion, according to some embodiments of the present disclosure. Method 1200 can be performed as part of a video encoding process (e.g., process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 can include the following steps 1202-1206.

In step 1202, a CU is determined whether being coded in GPM.

In step 1204, in response to the CU being coded in GPM, where the CU is split into a first partition and a second partition, a parameter is signaled to indicate whether TM is applied. For example, the parameter can be a flag used to indicate whether the TM is applied for the whole CU (e.g., the flag is signaled at CU level), or a plurality of parameters (e.g., flags) can be used to indicate whether the TM is applied for different partitions respectively. More details regarding the parameter will be further described below.

In step 1206, in response to the TM being applied, motions are refined for GPM partitions using the TM. If the TM is not applied to the CU, the motions are not refined. In some embodiments, if the TM is not applied to the CU, the motions can be refined using other methods.

In some embodiments, for more flexibility, it is determined whether to apply TM for each partition respectively. For example, when a coding unit is coded in GPM, a first parameter (e.g., a first flag) is signaled to indicate whether the first motion (indicated by a first merge index) of a first partition is refined using the TM. Then, a second parameter (e.g., a second flag) is signaled to indicate whether the second motion (indicated by a second merge index) of a second partition is refined using the TM. One example is shown in Table 4.

TABLE 4

Example of applying template matching to GPM

| the 1$^{st}$ parameter | the 2$^{nd}$ parameter | |
|---|---|---|
| 0 | 0 | the TM is not applied to either partitions |
| 0 | 1 | the TM is only applied to the 2$^{nd}$ partition |
| 1 | 0 | the TM is only applied to the 1$^{st}$ partition |
| 1 | 1 | the TM is applied to both partitions |

When the first parameter and the second parameter are both equal to 0, the TM is not applied to the two partitions. When the first parameter is equal to 0 and the second parameter is equal to 1, the TM is only applied to the second partition. When the first parameter is equal to 1 and the second parameter is equal to 0, the TM is only applied to the first partition. When the first parameter and the second parameter are both equal to 1, the TM is applied to the both partitions.

It is noted that the first and the second parameters can be combined into a third parameter (e.g., an index), as shown in Table 5.

TABLE 5

Example of applying template matching to GPM

| the 3$^{rd}$ parameter | |
|---|---|
| 0 | the TM is not applied to either partitions |
| 1 | the TM is only applied to the 2$^{nd}$ partition |
| 2 | the TM is only applied to the 1$^{st}$ partition |
| 3 | the TM is applied to both partitions |

When the third parameter is equal to 0, the TM is not applied to the two partitions. Neither the first motion of the first partition nor the second motion of the second partition is refined using the TM. When the third parameter is equal to 1, the TM is only applied to the second partition. The second motion of the second partition is refined using the TM, while the first motion of the first partition is not refined. When the third parameter is equal to 2, the TM is only applied to the first partition. The first motion of the first partition is refined using the TM, while the second motion of the second partition is not refined. When the third parameter is equal to 3, the TM is applied to both partitions. Both the first motion and the second motion are refined using the TM. In some embodiments, when the third parameter is equal to 1, the TM is only applied to the first partition. When the third parameter is equal to 2, the TM is only applied to the second partition.

Figure 13A:
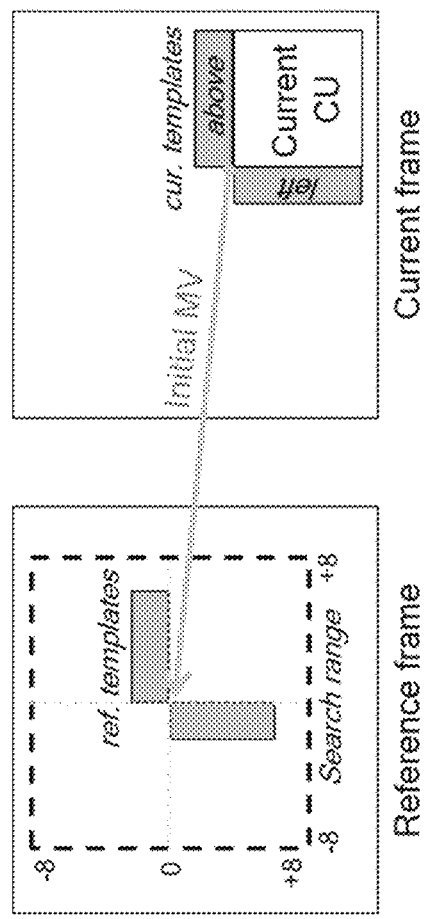
FIGS. 13A to 13C illustrate three exemplary templates for GPM, respectively, according to some embodiments of the present disclosure.
Figure 13B:
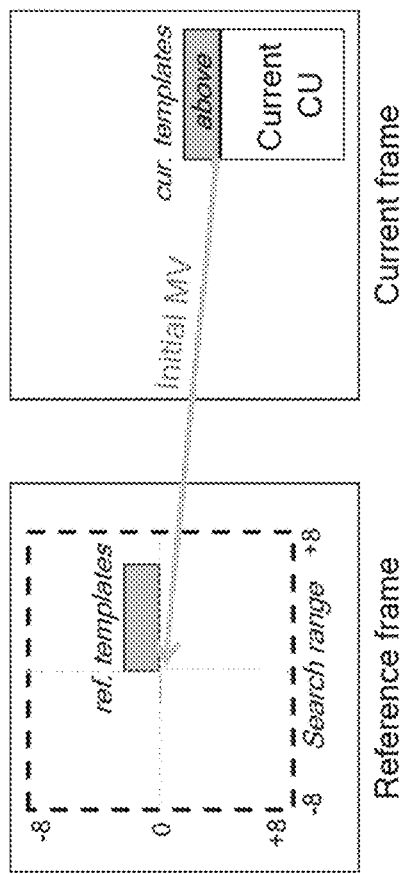
Figure 13C:
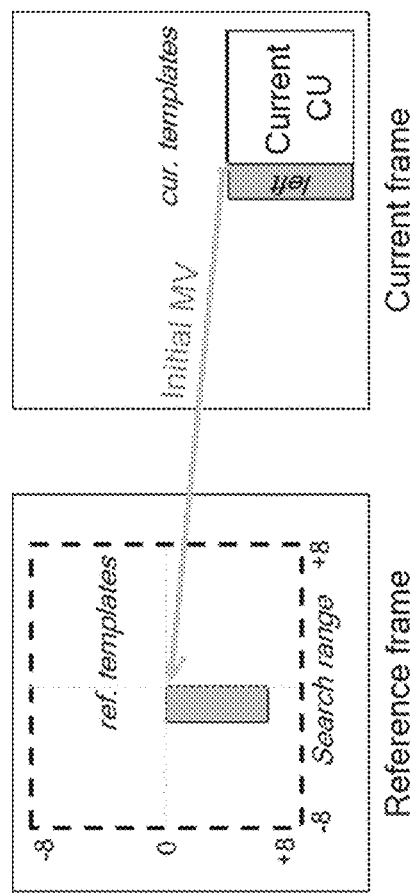

In some embodiments, when refining the motion of GPM, the template is constructed from left and/or above neighboring samples. FIGS. 13A to 13C illustrate three exemplary templates for GPM, respectively, according to some embodiments of the present disclosure.

As shown in FIG. 13A, the template is constructed from both left and above neighboring samples. For more flexibility, in some embodiments, only left or above neighboring samples can be used instead of always using both above and left neighboring samples. As shown in FIG. 13B, the template is constructed only from the above neighboring samples. As shown in FIG. 13C, the template is constructed only from the left neighboring samples. Furthermore, when the TM is applied to GPM coded block, a plurality of parameters is signaled to indicate which one of three templates is used. For example, an index is signaled to indicate the templates. When the index is equal to 0, the above and left neighboring samples are used to construct the template (as shown in FIG. 13A). When the index is equal to 1, the above neighboring samples are used (as shown in FIG. 13B). When the index is equal to 2, the left neighboring samples are used (as shown in FIG. 13C). In some embodiments, three parameters indicating the three templates respectively, are signaled.

It is contemplated that each partition can select the templates individually. For example, the first partition can select above neighboring samples as template, and the second partition can select left neighboring samples as template.

Figure 14:
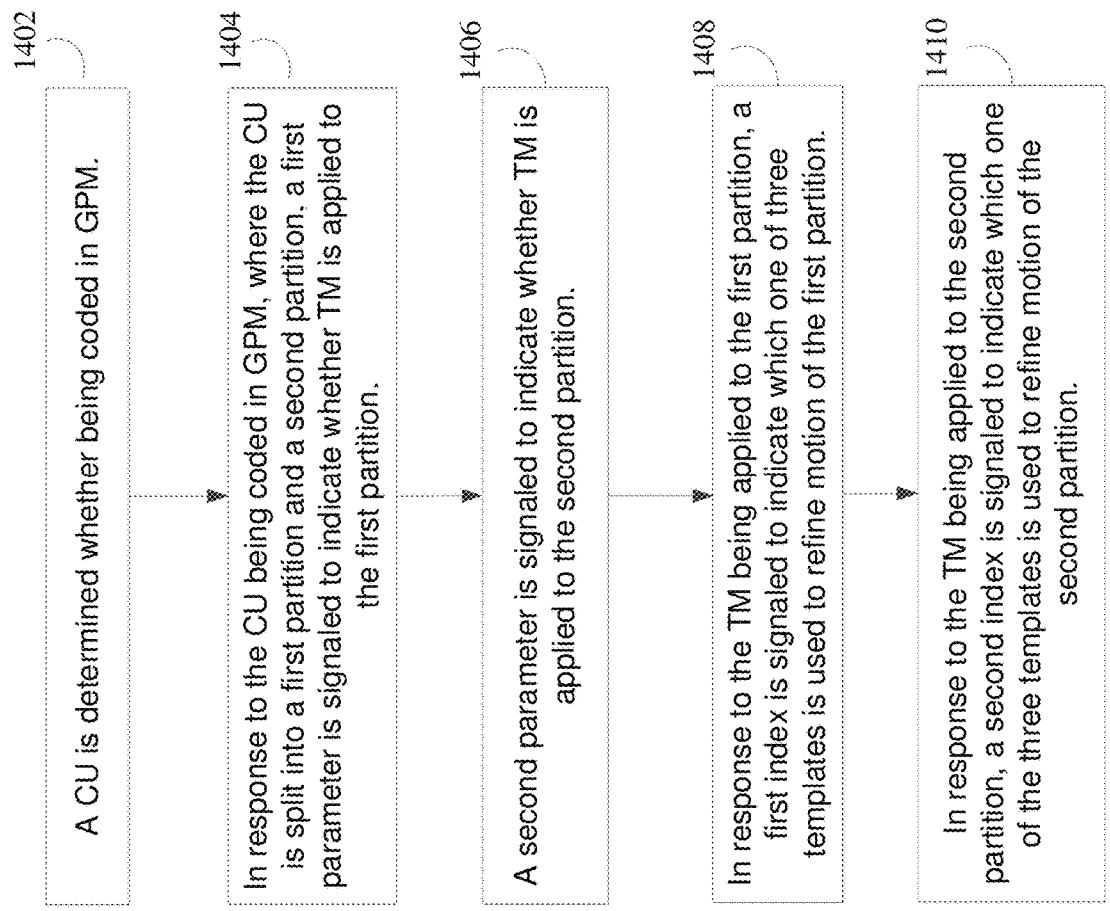
FIG. 14 illustrates another exemplary flow chart of a method for applying template matching to GPM to refine the motion, according to some embodiments of the present disclosure.

The aforementioned embodiments can be combined in any suitable manner. FIG. 14 illustrates another exemplary flow chart of a method 1400 for applying template matching to GPM to refine the motion, according to some embodiments of the present disclosure. As shown in FIG. 14, method 1400 can include the following steps 1402-1410.

In step 1402, a CU is determined whether being coded in GPM.

In step 1404, in response to the CU being coded in GPM, where the CU is split into a first partition and a second partition, a first parameter (e.g., a first flag) is signaled to indicate whether TM is applied to the first partition.

In step 1406, a second parameter (e.g., a second flag) is signaled to indicate whether TM is applied to the second partition. Therefore, whether TM being applied to the partitions can be determined respectively.

In step 1408, in response to the TM being applied to the first partition, a first index is signaled to indicate which one of three templates is used to refine motion of the first partition. If the TM is not applied to the first partition, the first index is not signaled.

In step 1410, in response to the TM being applied to the second partition, a second index is signaled to indicate which one of the three templates is used to refine motion of the second partition. If the TM is not applied to the second partition, the second index is not signaled.

Then motion for the first partition can be refined using the TM with a template determined by the first index, and the motion for the second partition can be refined using the TM with a template determined by the second index.

In some embodiments, instead of signaling which template is used, it is proposed to derive the template based on the GPM.

Figure 15A:
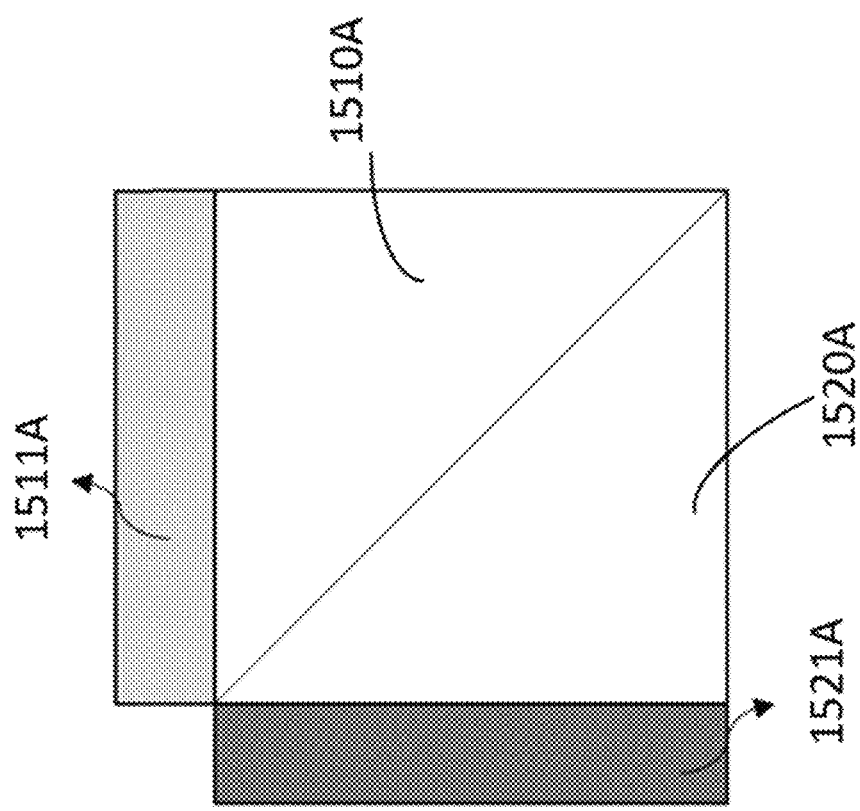
FIGS. 15A and 15B illustrate another variation of exemplary templates for GPM, according to some embodiments of the present disclosure.
Figure 15B:
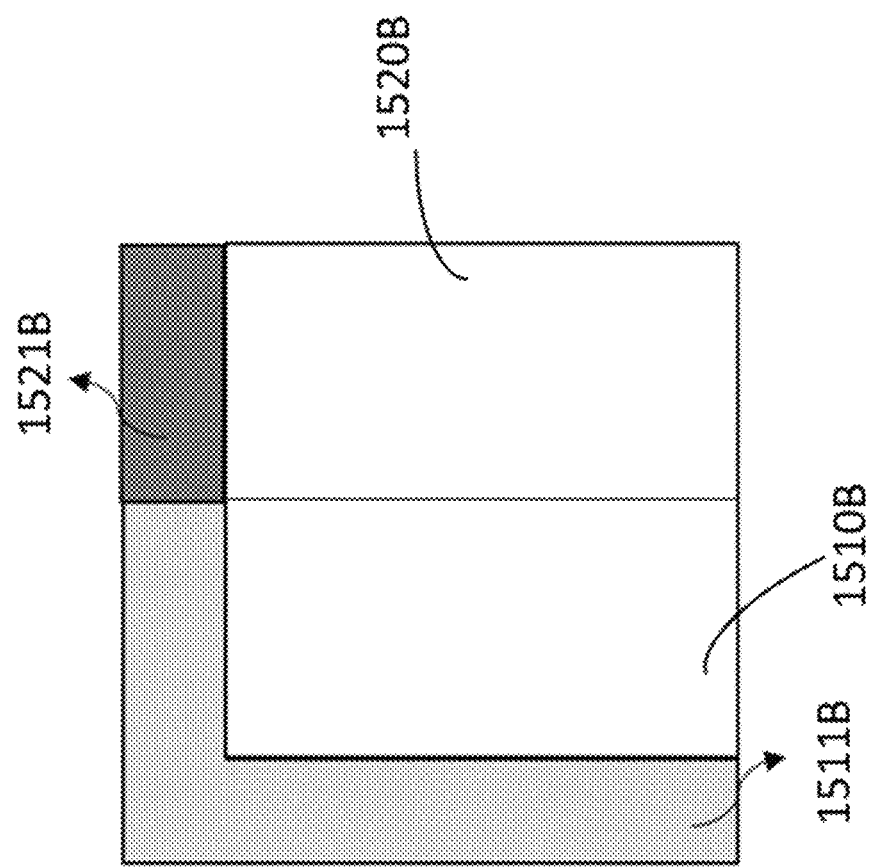

FIGS. 15A and 15B illustrate another variation of exemplary templates for GPM, according to some embodiments of the present disclosure. In general, instead of signaling the index of the template for a given GPM partition, the choice of template (left neighboring samples, top neighboring samples, or both left and top neighboring samples) can depend on the partition mode of the GPM. Taking either of the GPM partitions as an example, if the GPM partition has only top neighboring samples, then only top template is used; if the GPM partition has only left neighboring samples, then only left template is used; and if the GPM partition has both top and left neighboring samples, then both top and left templates are used.

As shown in FIG. 15A, for the first partition 1510A, only top template 1511A is used for refining motion. For the second partition 1520A, only the left template 1521A is used for refining motion.

As shown in FIG. 15B, For the first partition 1510B, both left and top templates 1511B are used for refining motion. For the second partition 1520B, only the top template 1521B is used for refining motion.

In some embodiments, the template is derived based on GPM partition angles. FIG. 16 illustrates exemplary relationship between GPM partition modes and GPM partition angles, according to some embodiments of the present disclosure. In the syntax, the GPM partition modes can be noted as merge_gpm_partition_idx, the GPM partition angles can be noted as angleIdx, and the distance can be noted as distanceIdx. As shown in FIG. 16, there are in total 64 partition modes which contain 20 angles and 4 distances.

During the refining of motion of GPM, a template is first selected, according to the partition angle, from the left neighboring samples only, the top neighboring samples only, or both the left and top neighboring samples. The basic principle for the template selection is as follows. The top and left neighboring samples are determined for a partition. If only top neighboring samples are available for the partition and the left neighboring samples are unavailable, the template is selected from the top neighboring samples only. If only left neighboring samples are available for the partition and the top neighboring samples are unavailable, the template is selected from the left neighboring samples only. If both the left and top neighboring samples are available, then the template is selected from both the left and top neighboring samples.

Figure 17:
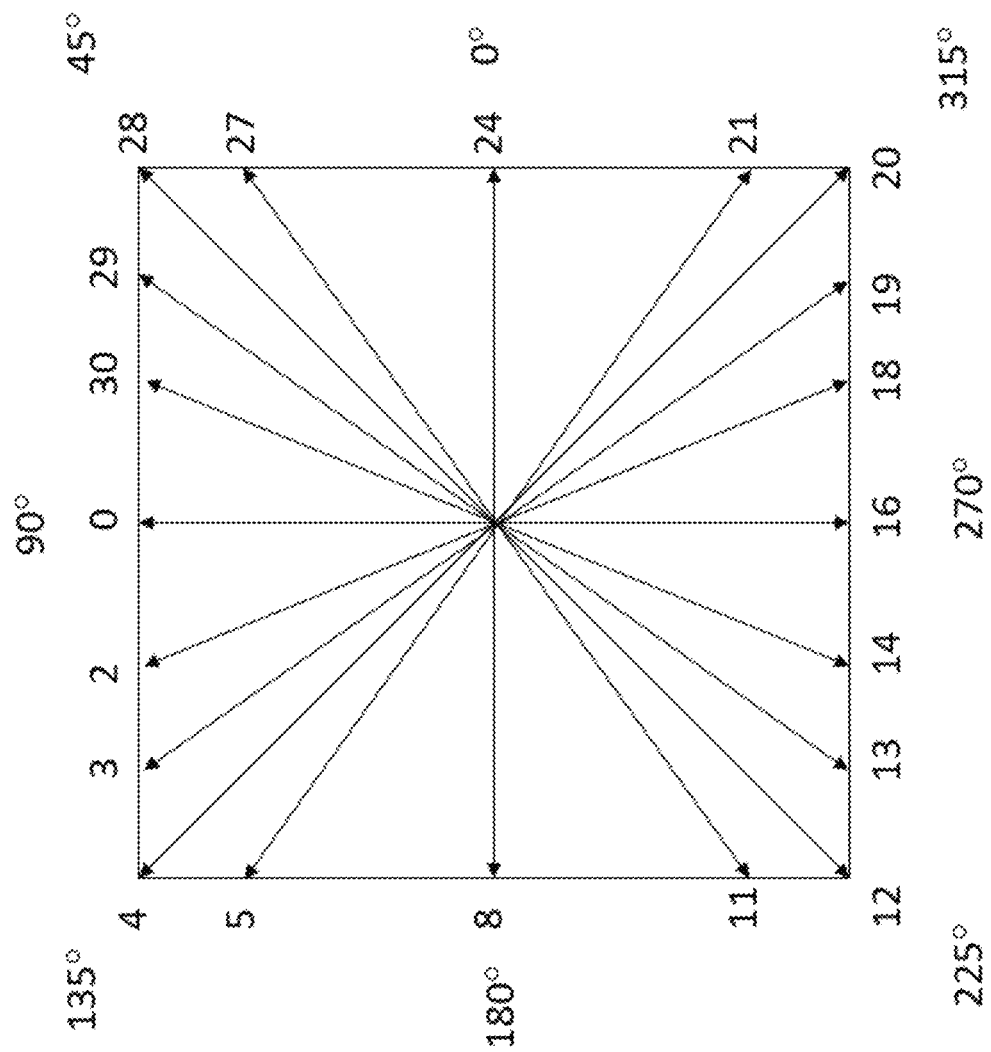
FIG. 17 illustrates exemplary angles for a 16×16 block, according to some embodiments of the present disclosure.
Figure 18A:
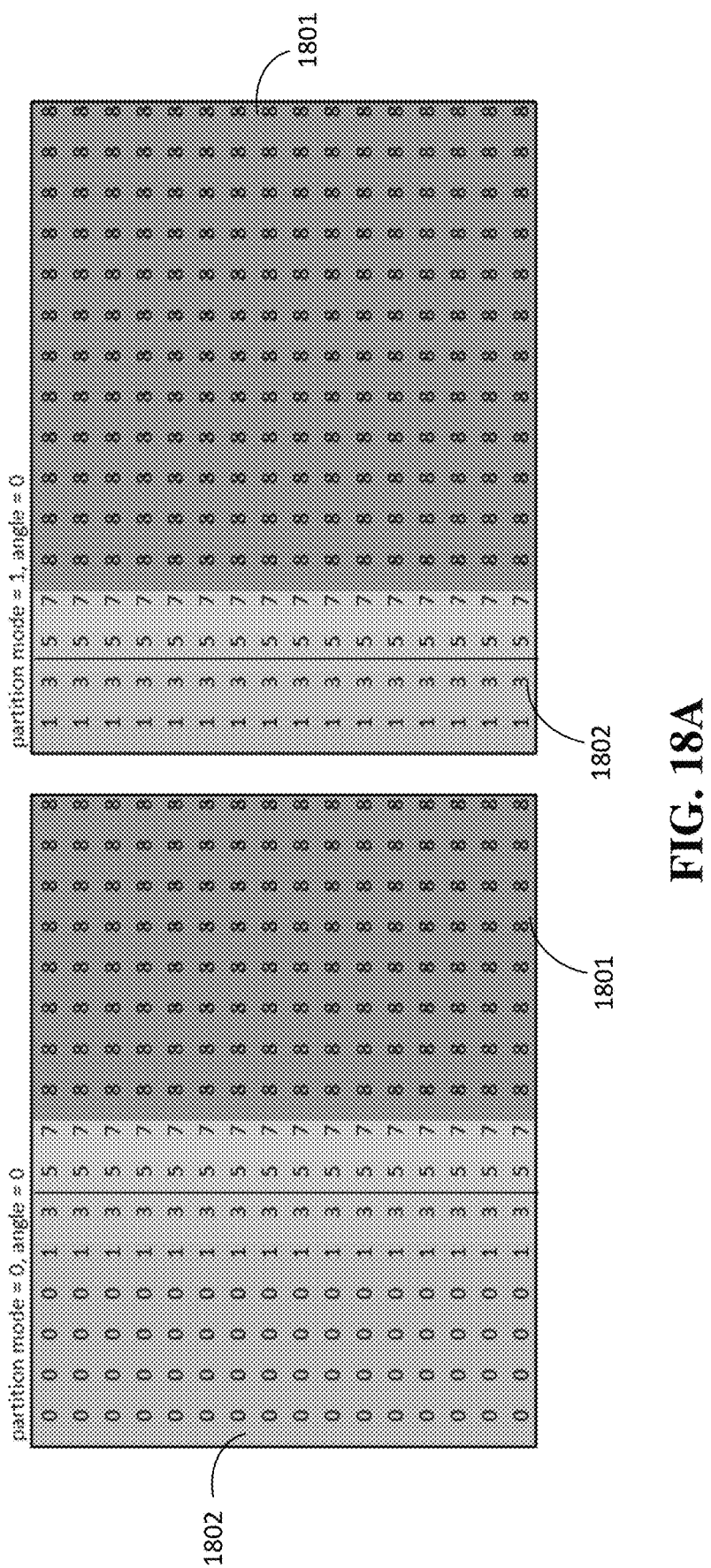
FIGS. 18A-18T illustrate exemplary weights for each sample for different GPM partition modes for each partition angles shown in FIG. 17 for a 16×16 block, according to some embodiments of the present disclosure.
Figure 18B:
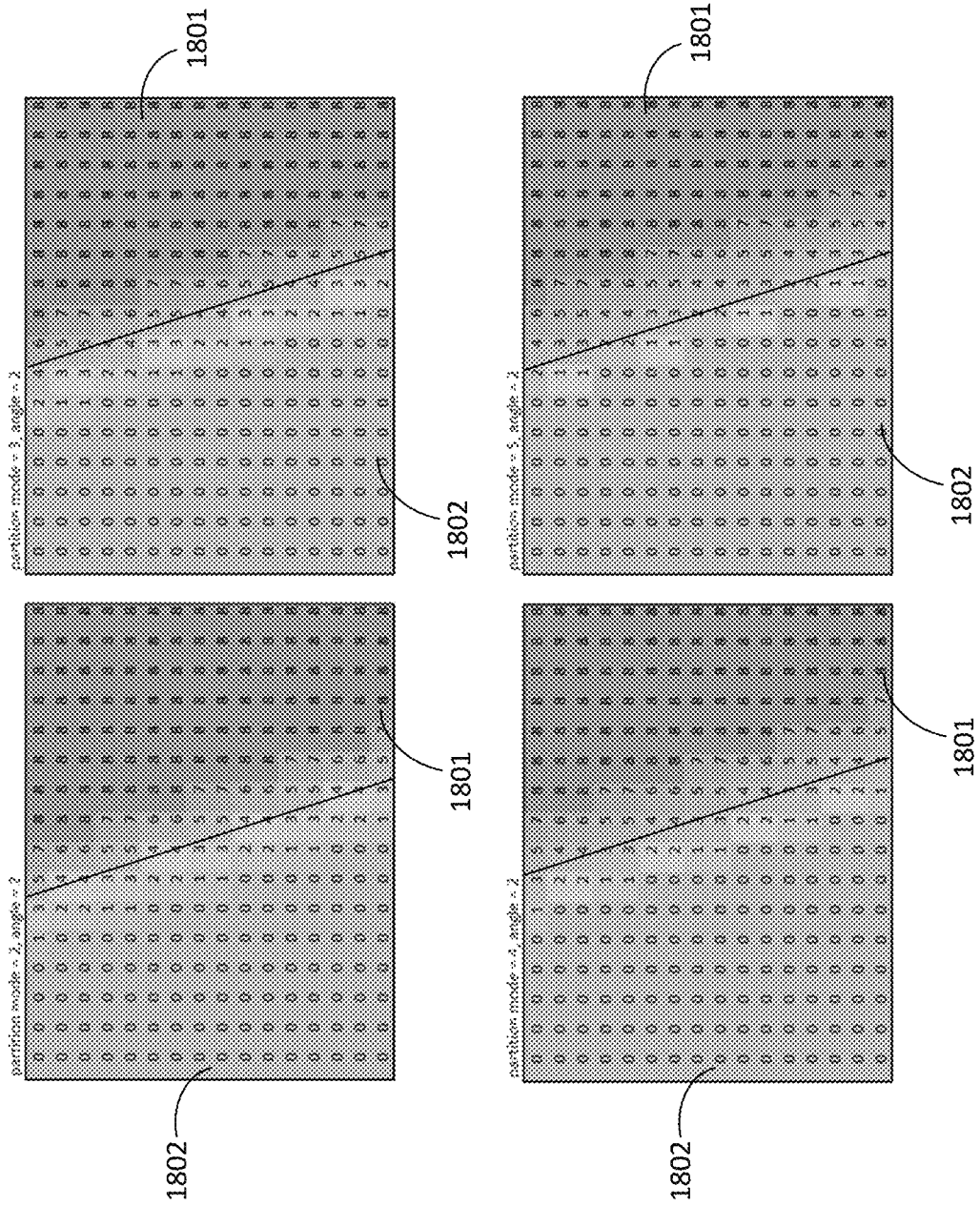
Figure 18C:
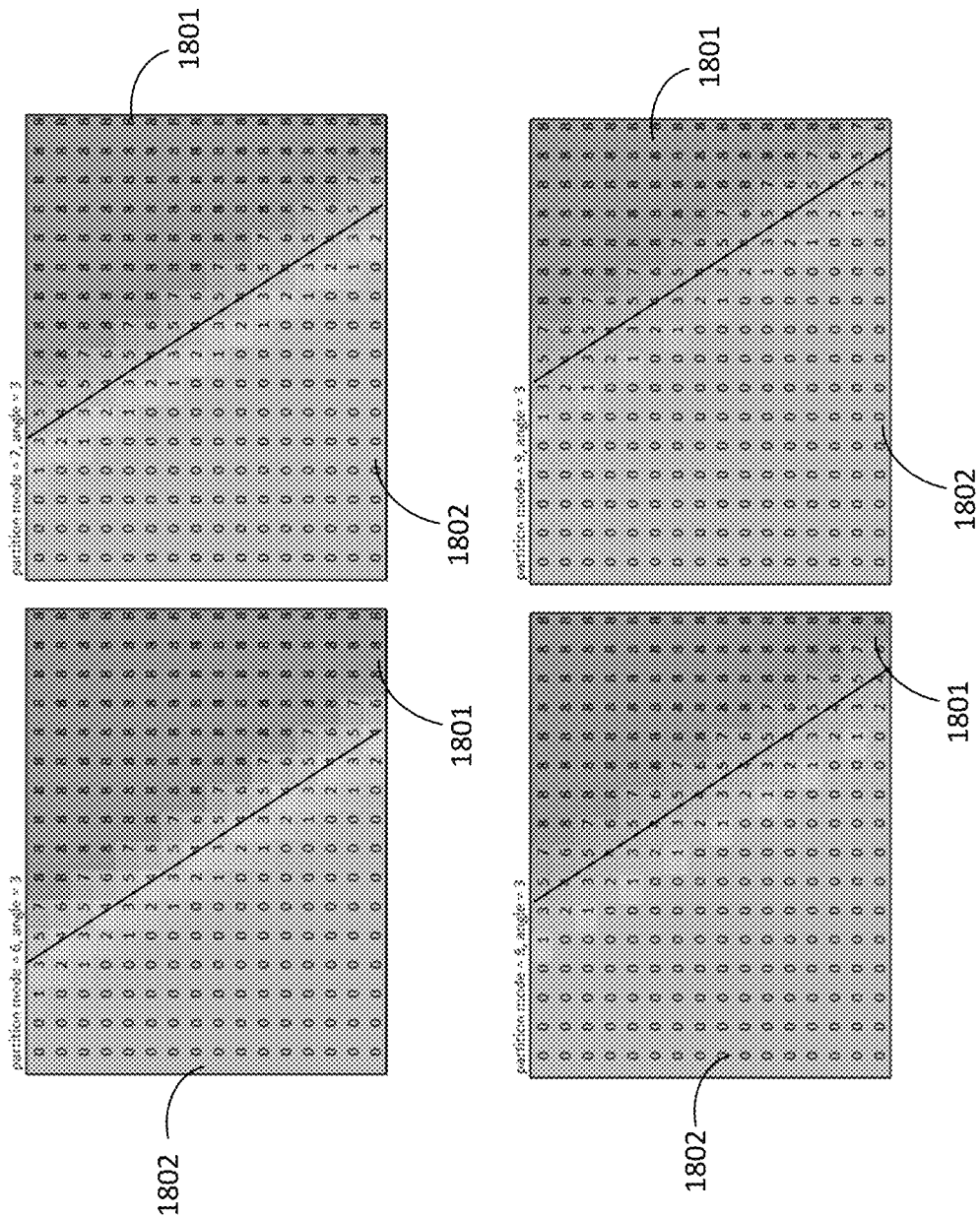
Figure 18D:
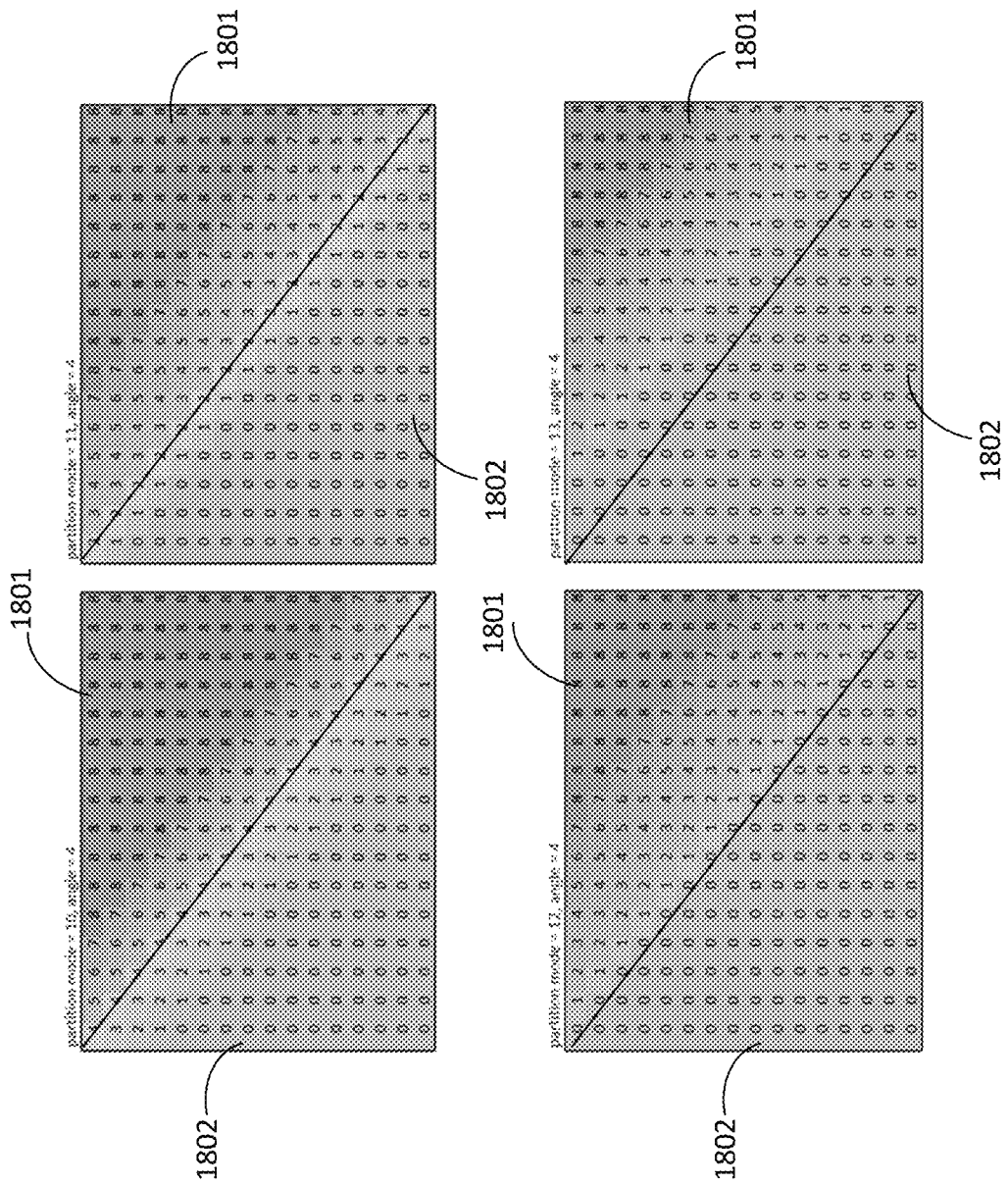
Figure 18E:
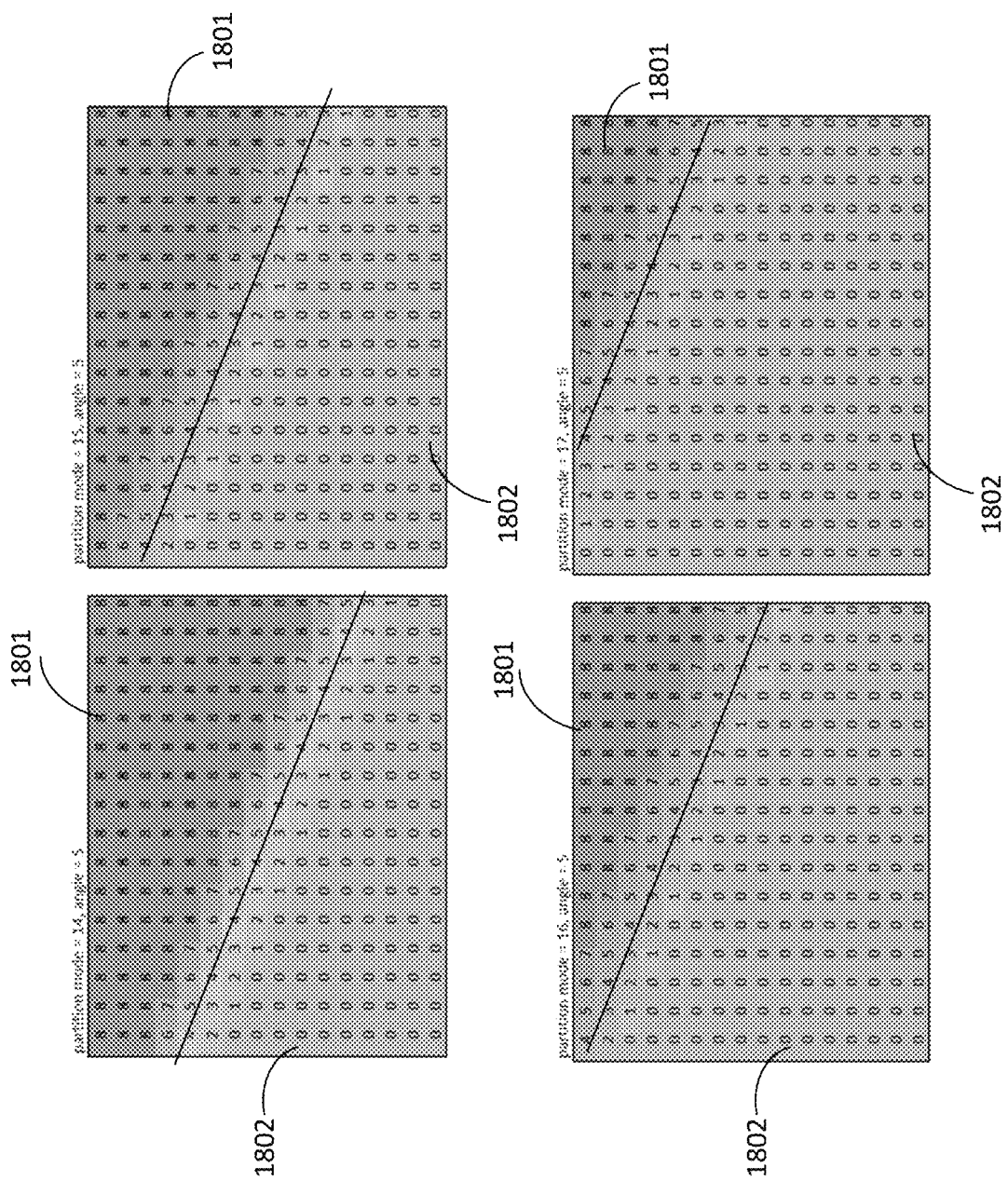
Figure 18F:
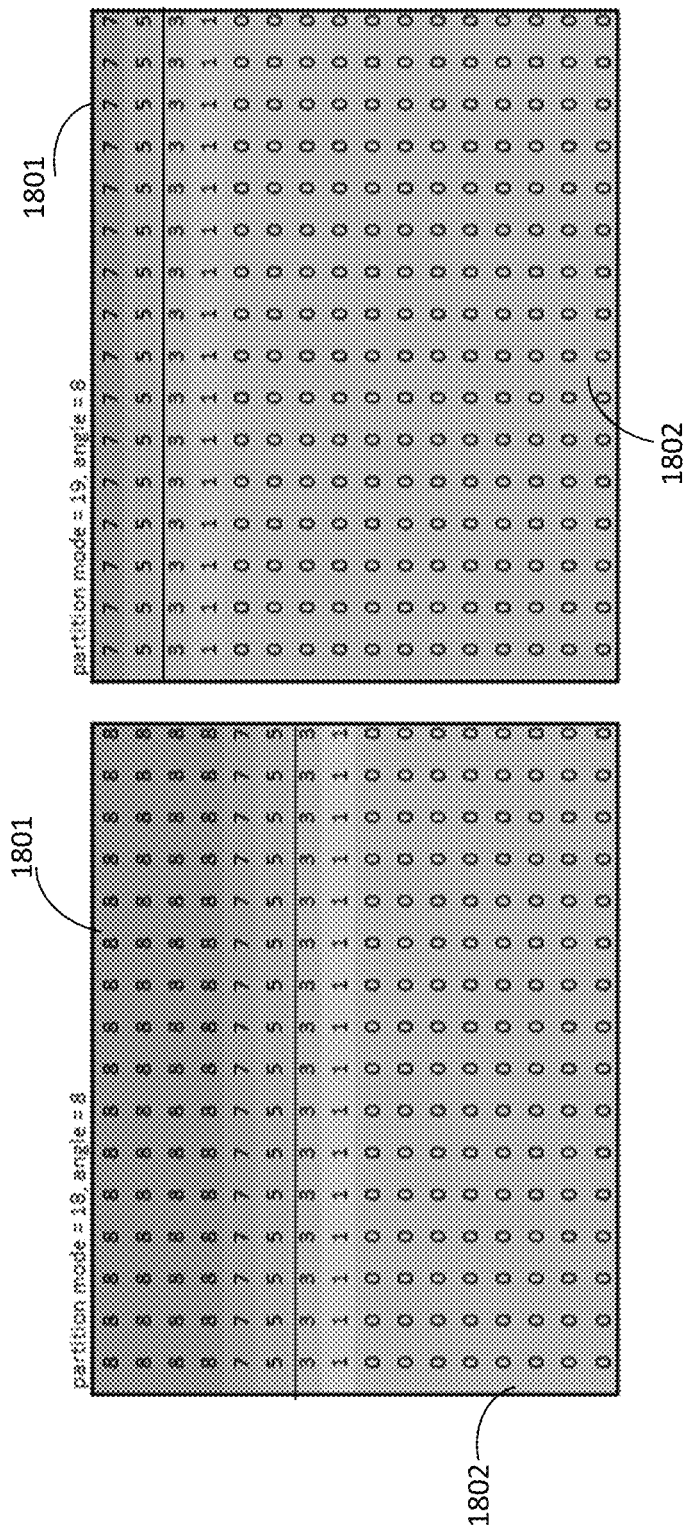
Figure 18G:
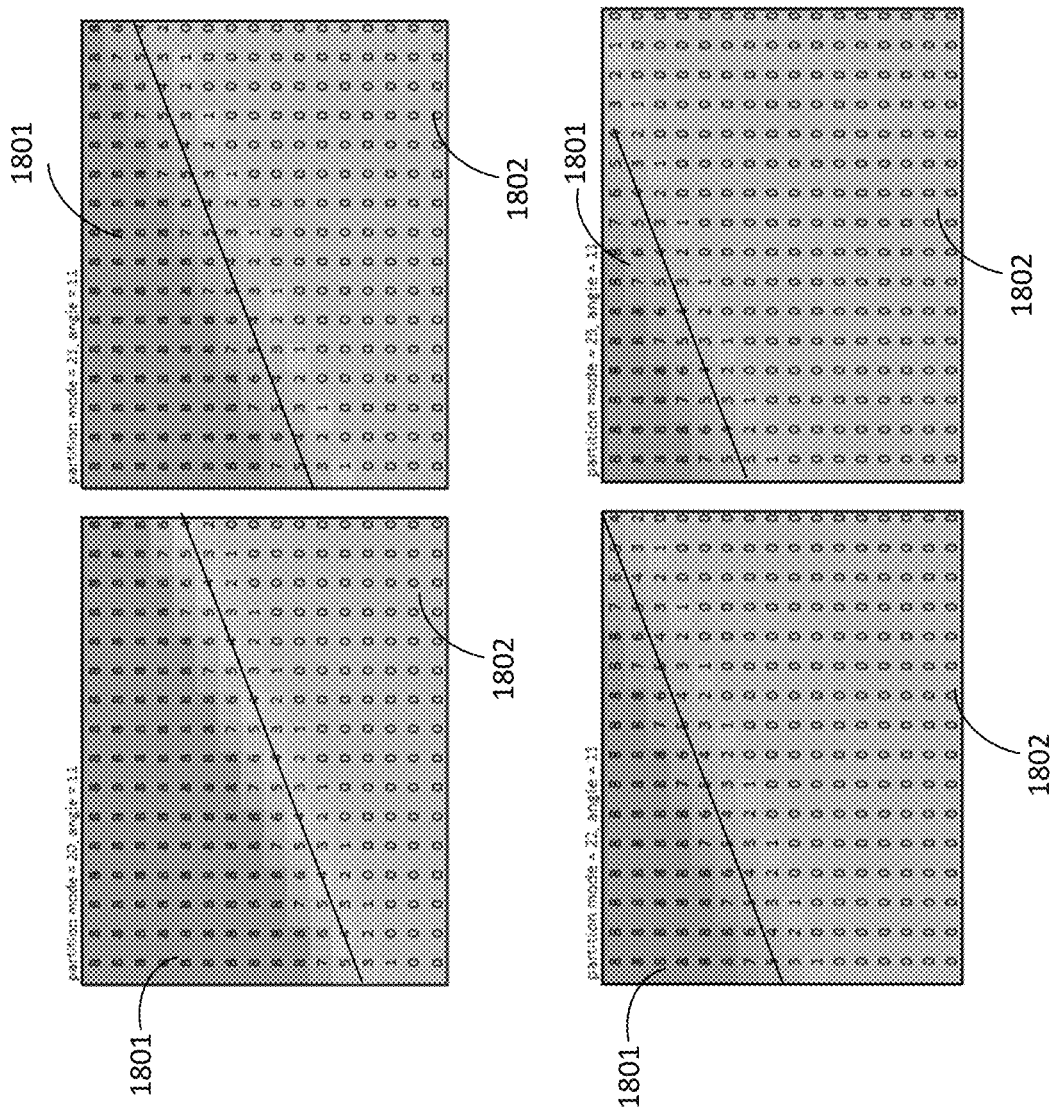
Figure 18H:
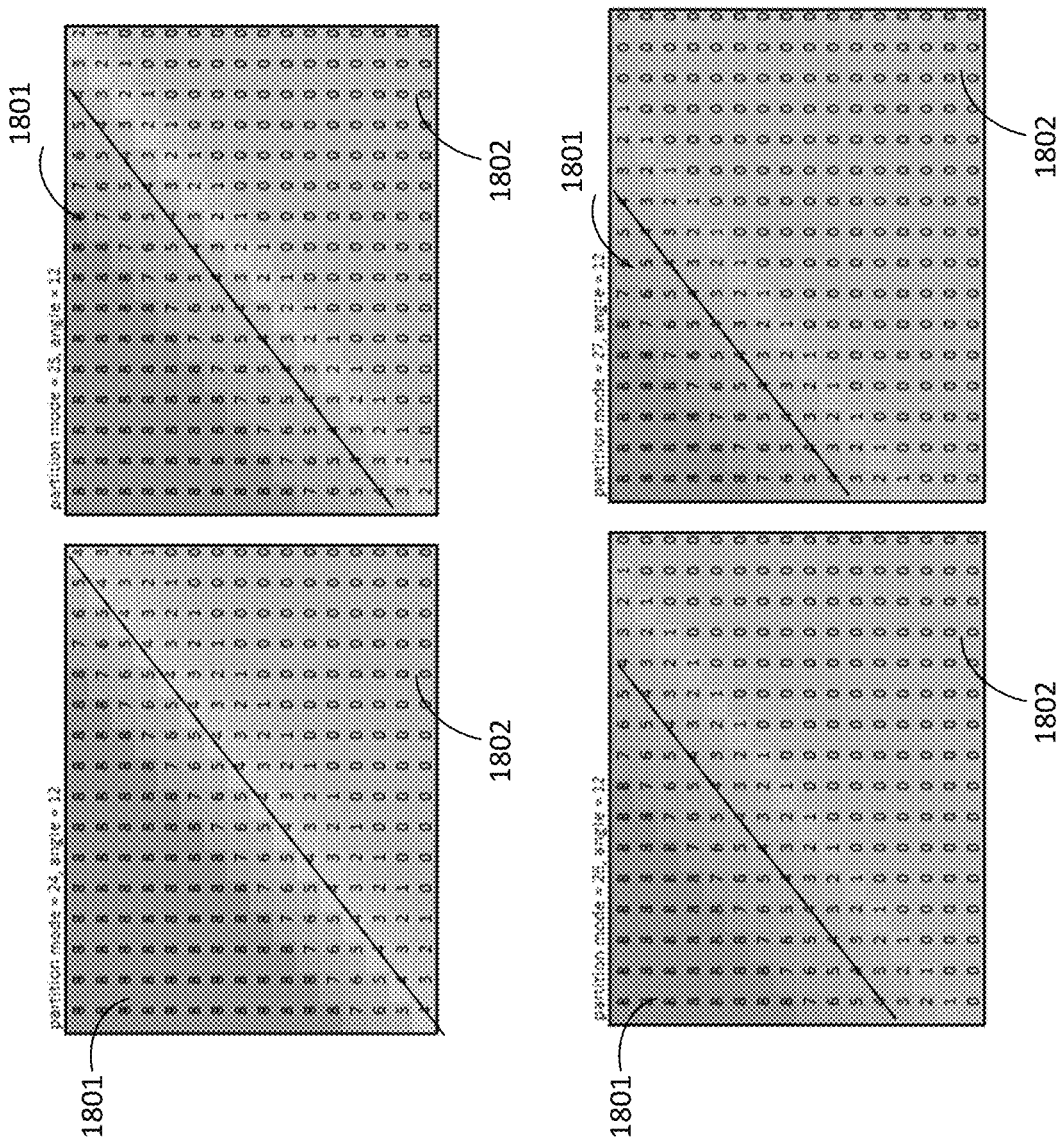
Figure 18I:
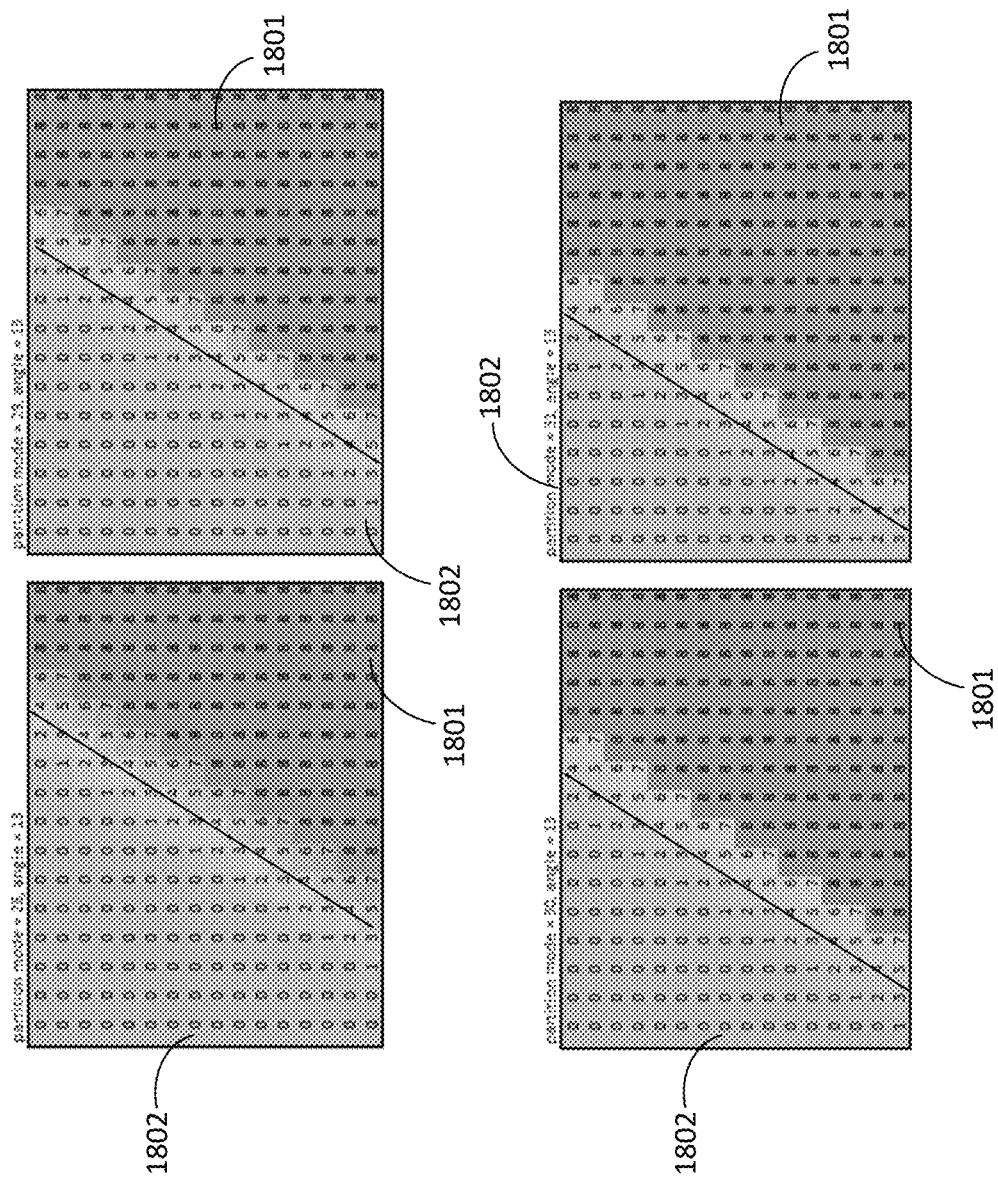
Figure 18J:
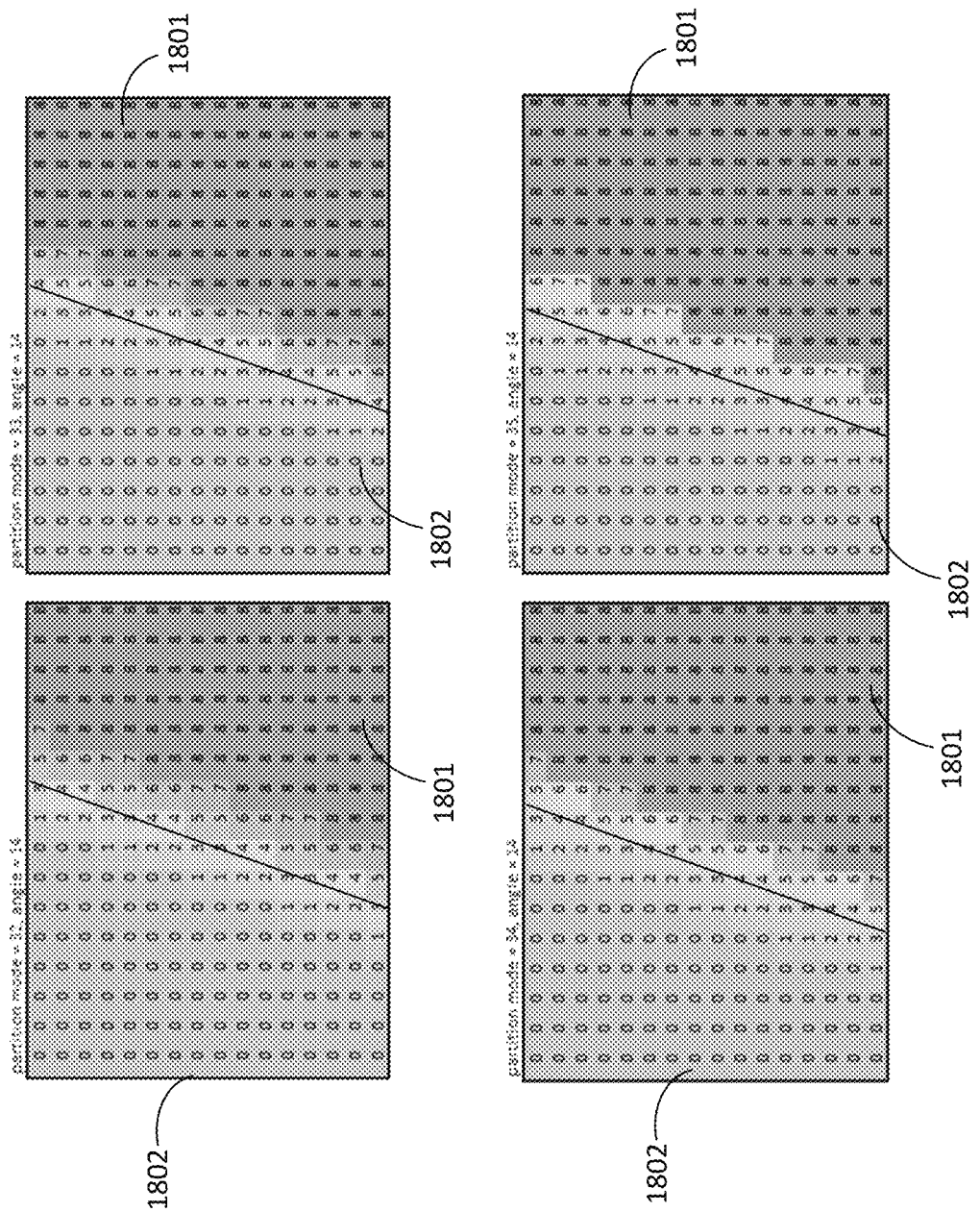
Figure 18K:
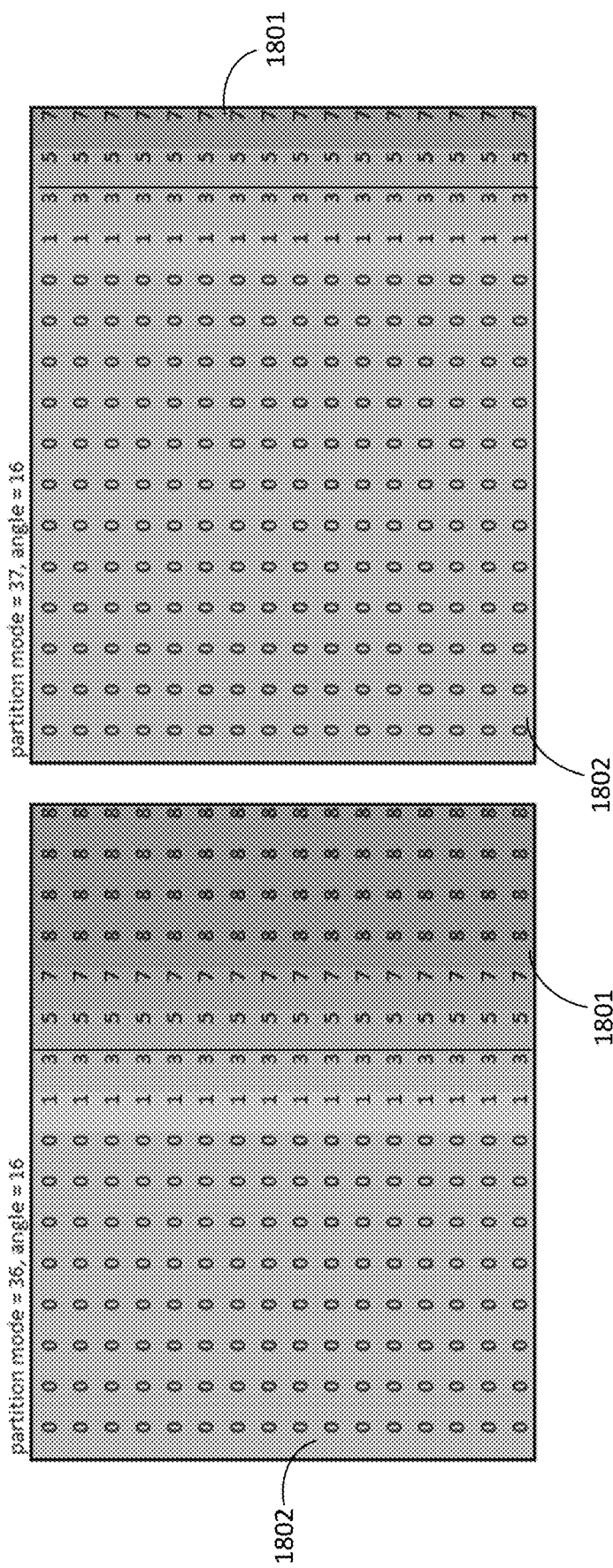
Figure 18L:
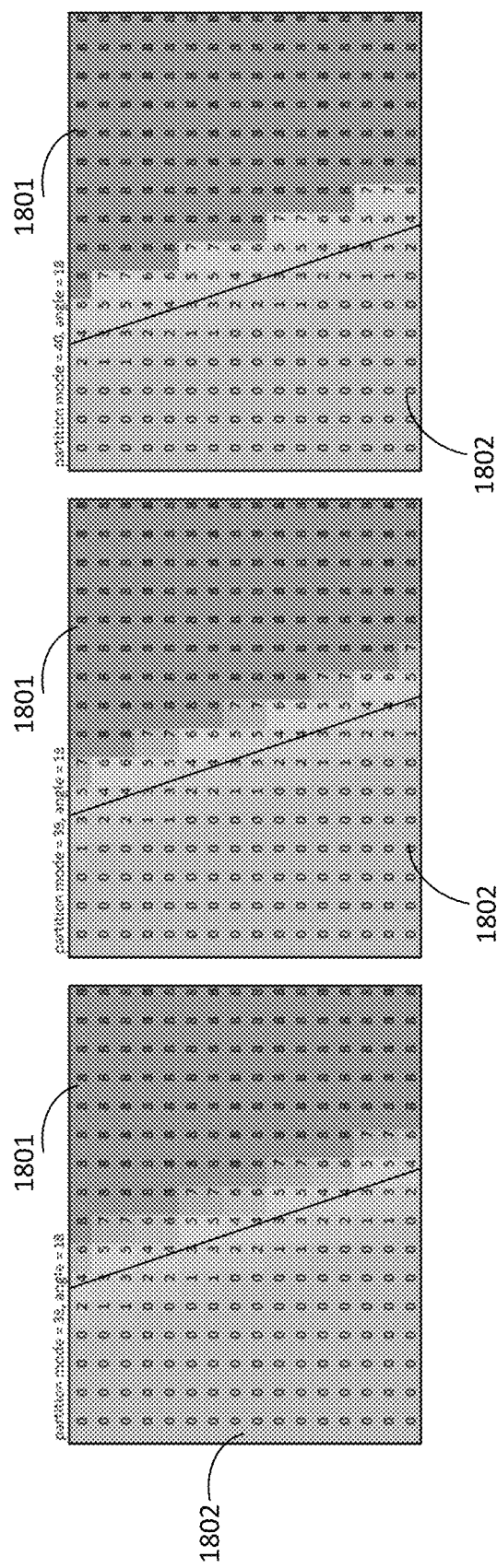
Figure 18M:
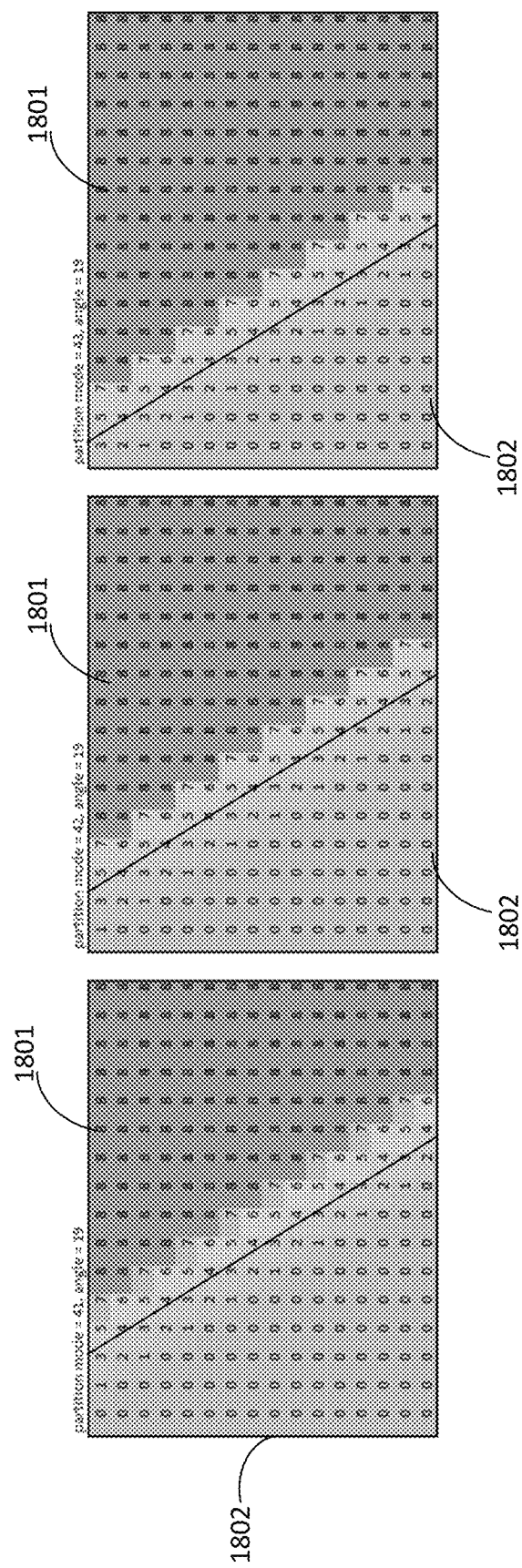
Figure 18N:
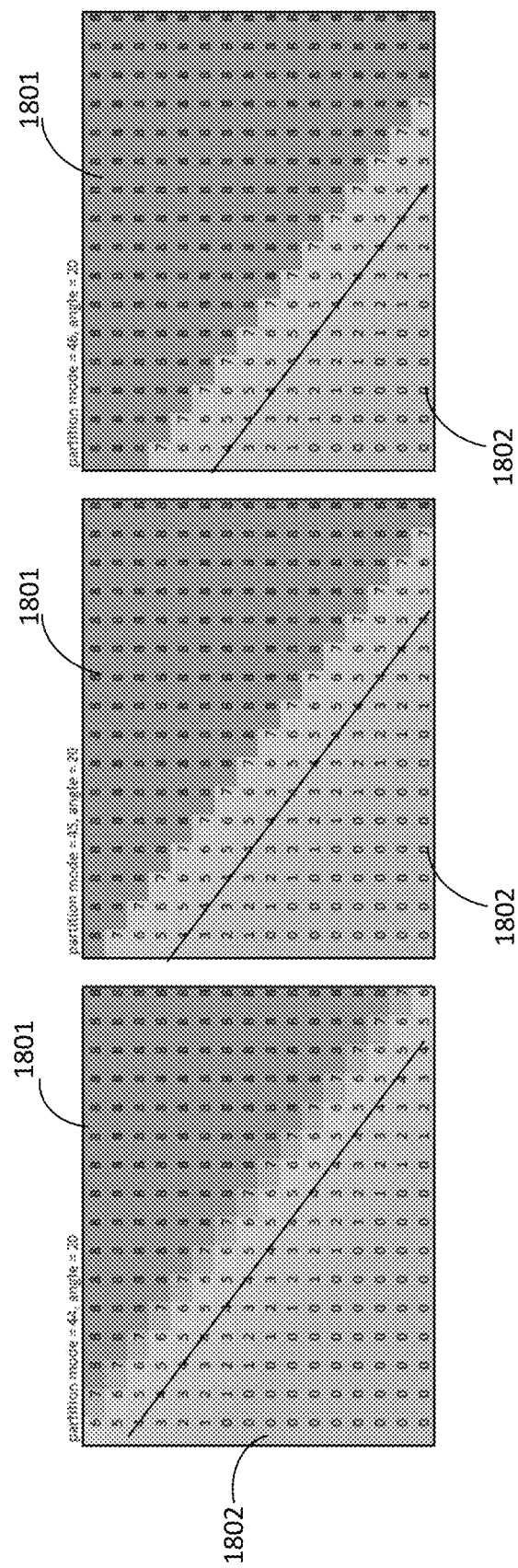
Figure 18O:
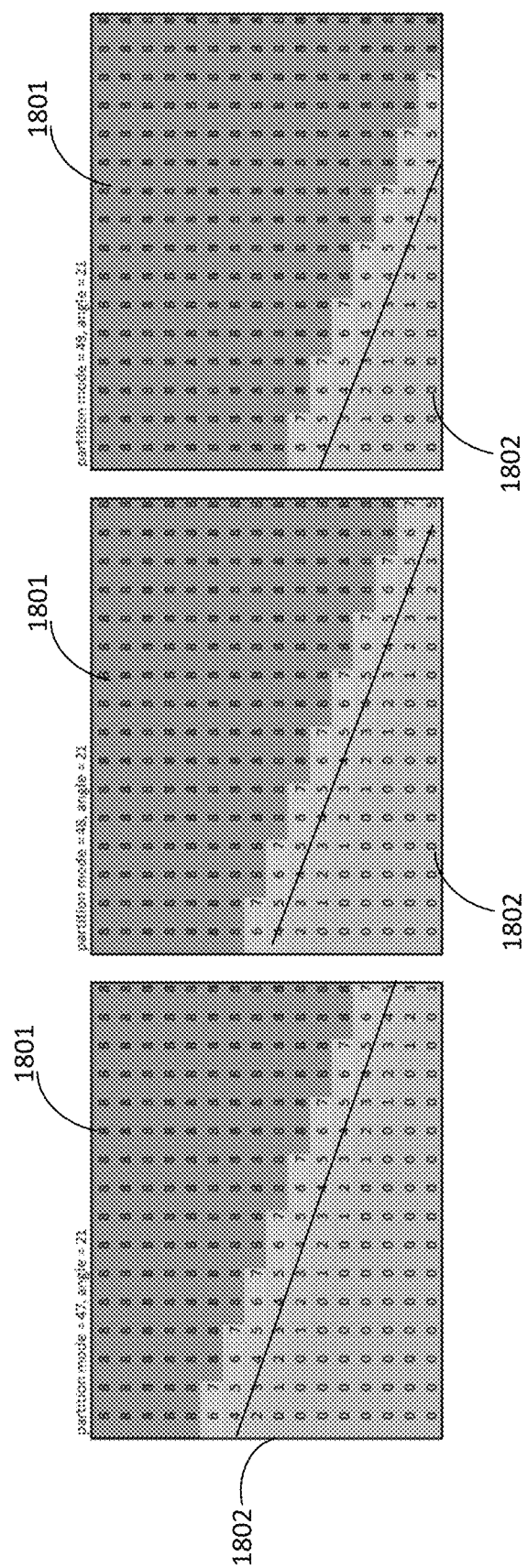
Figure 18P:
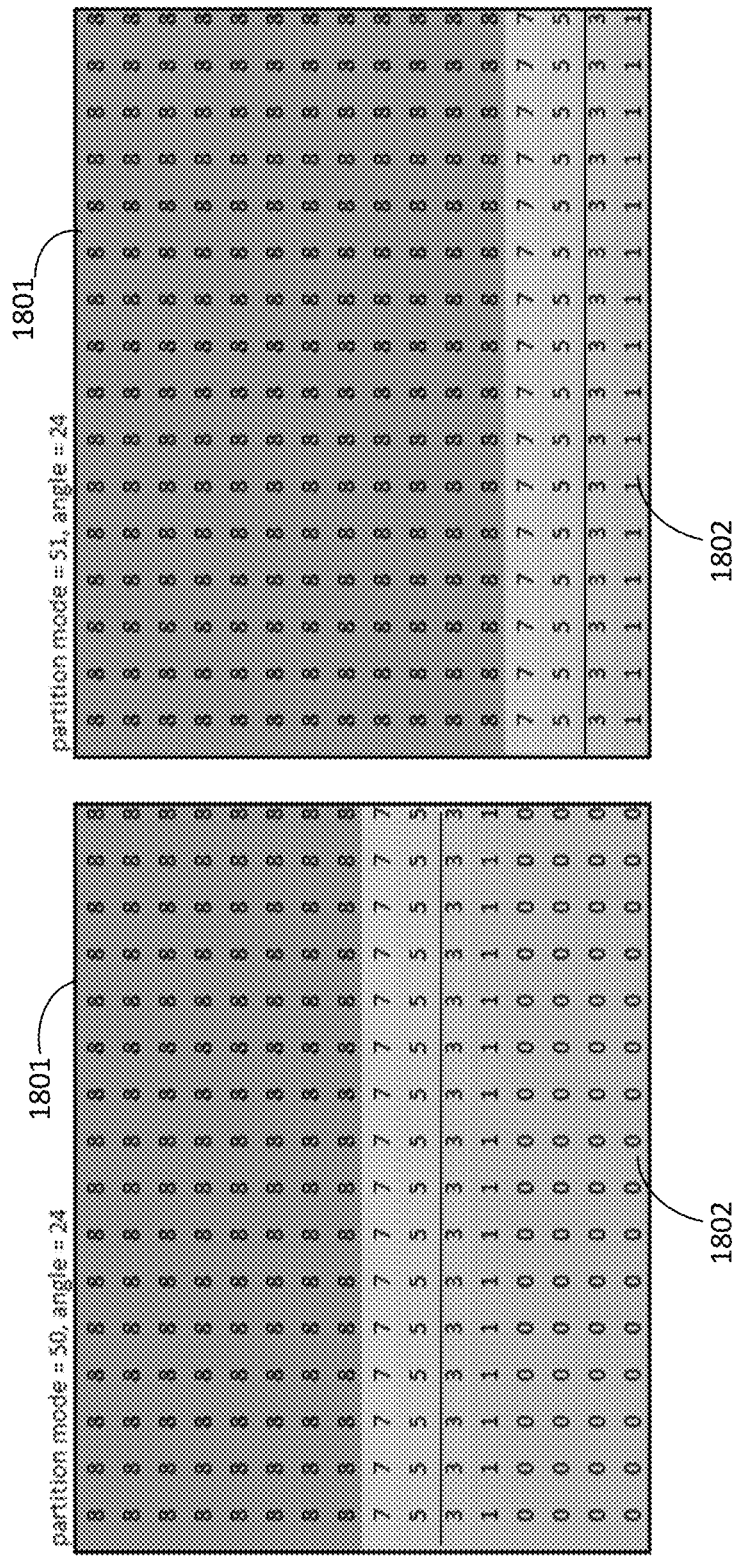
Figure 18Q:
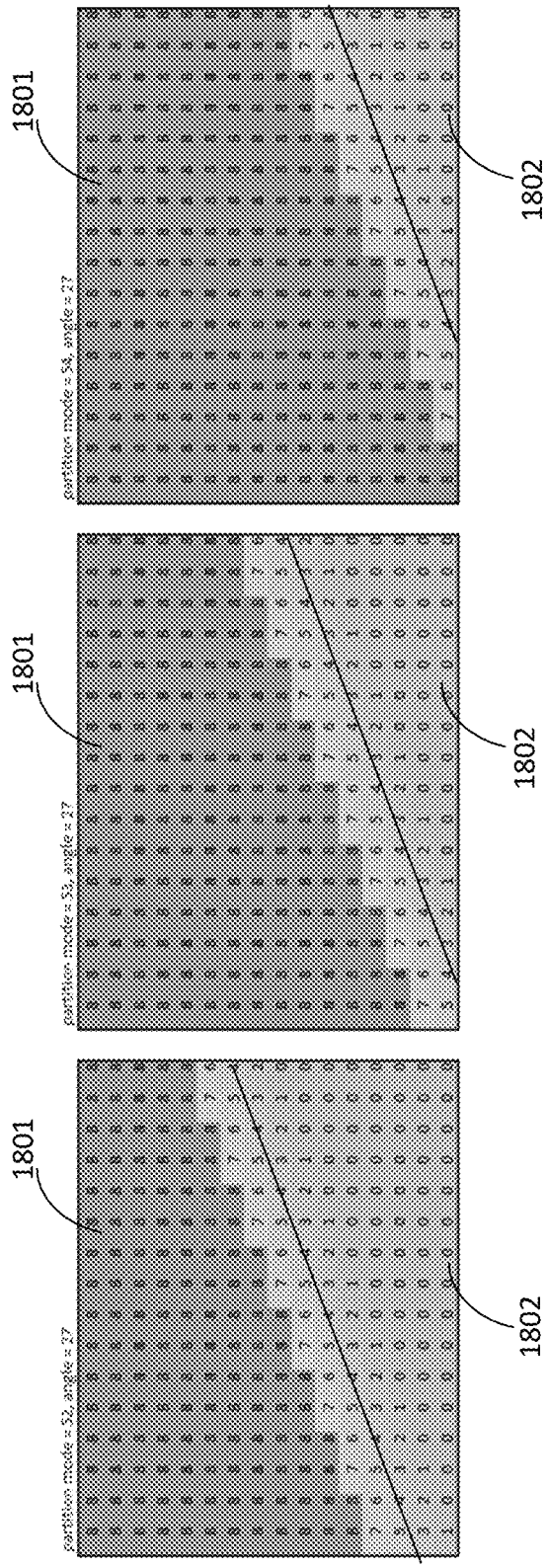
Figure 18R:
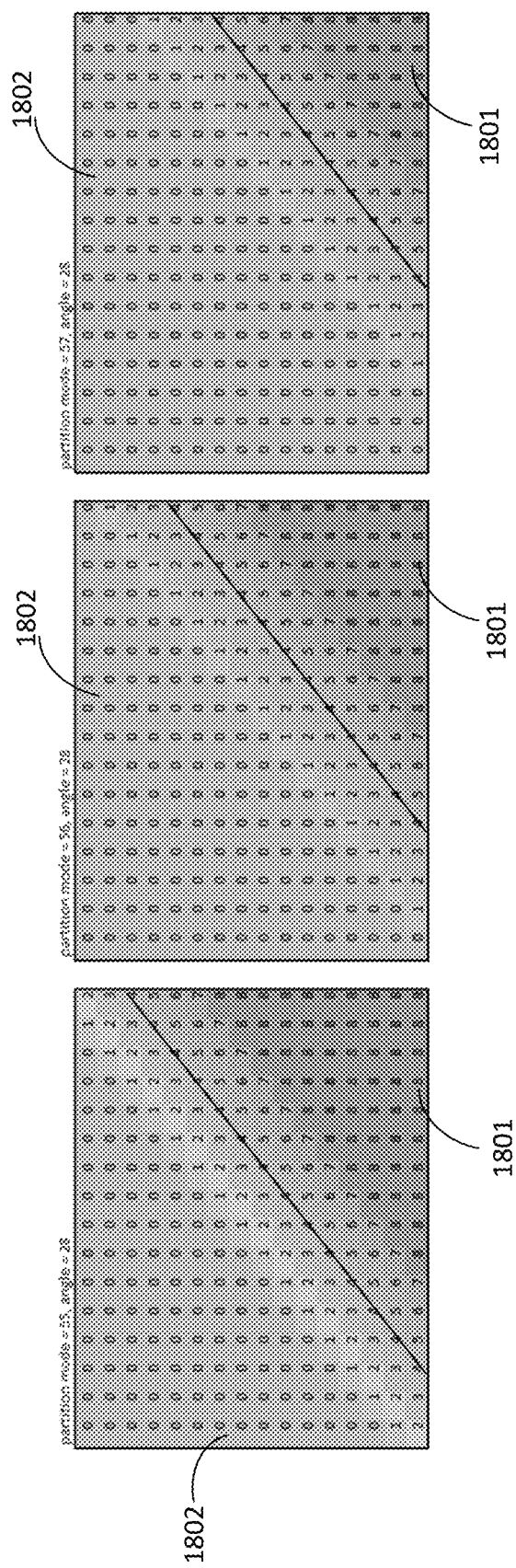

FIG. 17 illustrates exemplary angles for a 16×16 block, according to some embodiments of the present disclosure. As shown in FIG. 17, a block can be partitioned with different angles, for example, noted as partition angles with different numbers. FIGS. 18A-18T illustrate exemplary weights for each sample for different GPM partition modes for each partition angles shown in FIG. 17 for a 16×16 block, according to some embodiments of the present disclosure. As shown in FIGS. 18A-18T, a CU is split into a first partition 1810 and a second partition 1820 by a splitting line. Sample values along the geometric partition edge (the splitting line) are adjusted using with adaptive weights. The first partition 1810 is predicted using a first motion indicated by a first merge index, and a second partition 1820 is predicted using a second motion indicated by a second merge index. The first and the second merge indices are signaled when blocks are coded using GPM. Specifically, as shown in FIGS. 18A, 18B, 18C, 18I, 18J, 18K, 18L, 18M, 18S, and 18T. for partition angle 0, 2, 3, 13, 14, 16, 18, 19, 29 and 30, respectively, the top neighboring samples are selected as the template for the first partition that is predicted using the first motion, and the left and top neighboring samples are selected as the template for the second partition that is predicted using the second motion. As shown in FIGS. 18D and 18N, for partition angles 4 and 20, respectively, the top neighboring samples are selected as the template for the first partition, and the left neighboring samples are selected as the template for the second partition. As shown in FIGS. 18E, 18F, 18G, 18O, 18P, and 18Q, for partition angles 5, 8, 11, 21, 24 and 27, respectively, the left and top neighboring samples are both selected as the template for the first partition, and the left neighboring samples are selected as the template for the second partition. For partition angles 12 and 28, the left and top neighboring samples are both selected as the template for the first and the second partitions.

When refining the motion of GPM, the search pattern can be any one of patterns shown in Table 1. In some embodiments, the search method can be the same as the one used for merge mode with alternative interpolation filter being off.

Figure 19:
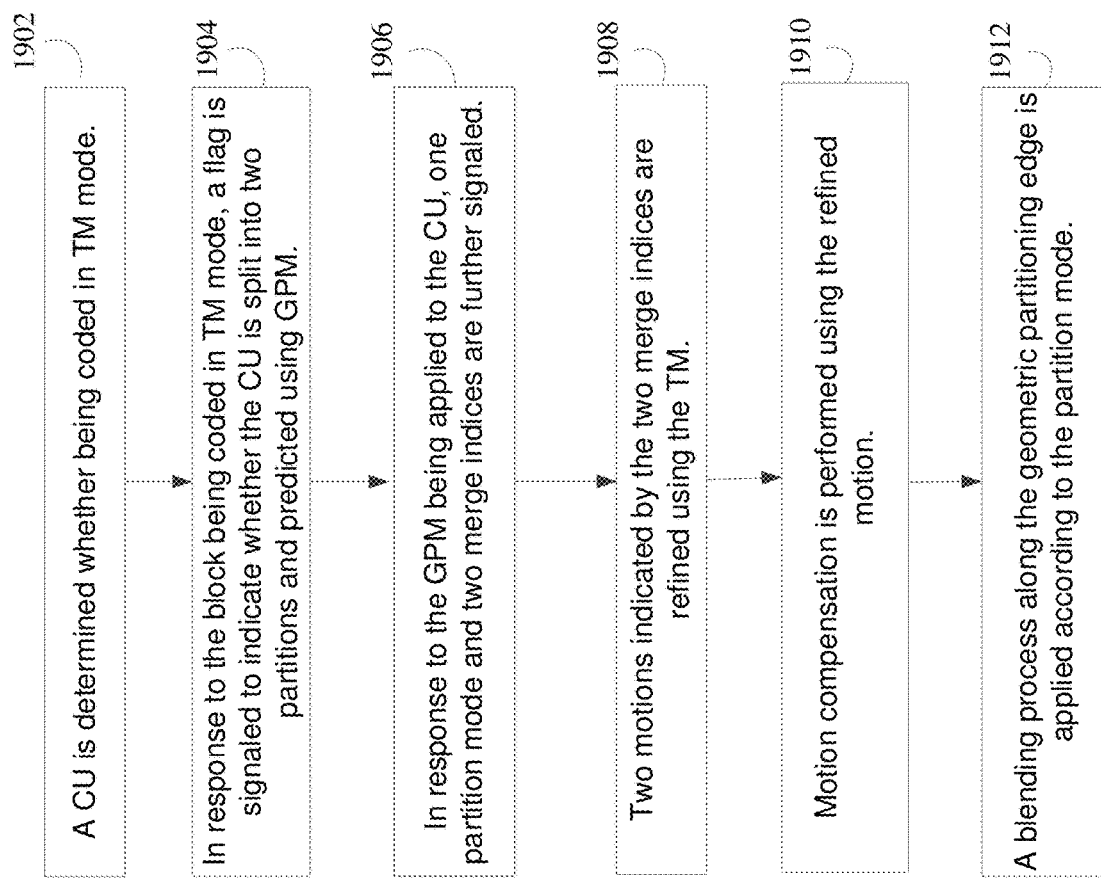
FIG. 19 illustrates another exemplary flow chart of a method for applying template matching to GPM to refine the motion, according to some embodiments of the present disclosure.

FIG. 19 illustrates another exemplary flow chart of a method 1900 for applying template matching to GPM to refine the motion, according to some embodiments of the present disclosure. Method 1900 can be performed as a video encoding process (e.g., by process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 1900. In some embodiments, method 1900 can be implemented by a computer program product, embodied in a computer-readable medium, including computer-executable instructions, such as program code, executed by computers (e.g., apparatus 400 of FIG. 4). Referring to FIG. 19, method 1900 can include the following steps 1902-1912.

In step 1902, a CU is determined whether being coded in TM mode.

In step 1904, in response to the CU being coded in TM mode, a flag is signaled to indicate whether the CU is split into two partitions and predicted using GPM. For example, when the flag equals to 1, the CU is split into a first partition and a second partition and GPM is used for prediction. When the flag equals to 0, the GPM is not applied, and the CU is not split.

In step 1906, in response to the GPM being applied to the CU, one partition mode and two merge indices are further signaled. Therefore, when the GPM is applied, the CU is split based on the partition mode. The two merge indices are signaled indicating two motions for the first partition and the second partition respectively.

In step 1908, two motions indicated by the two merge indices are refined using the TM.

In some embodiments, the method 1900 can further include steps 1910 and 1912.

In step 1910, motion compensation is performed using the refined motion.

In step 1912, a blending process along the geometric partitioning edge is applied according to the partition mode.

In some embodiments, step 1910 and 1912 can be performed in any other methods, for example, methods 1200 and 1400, in which the TM is used to refine motions for CU coded in GPM.

It is noted that the methods of applying the TM to GPM can also be applied to AWP mode in AVS3 standard.

Figure 20:
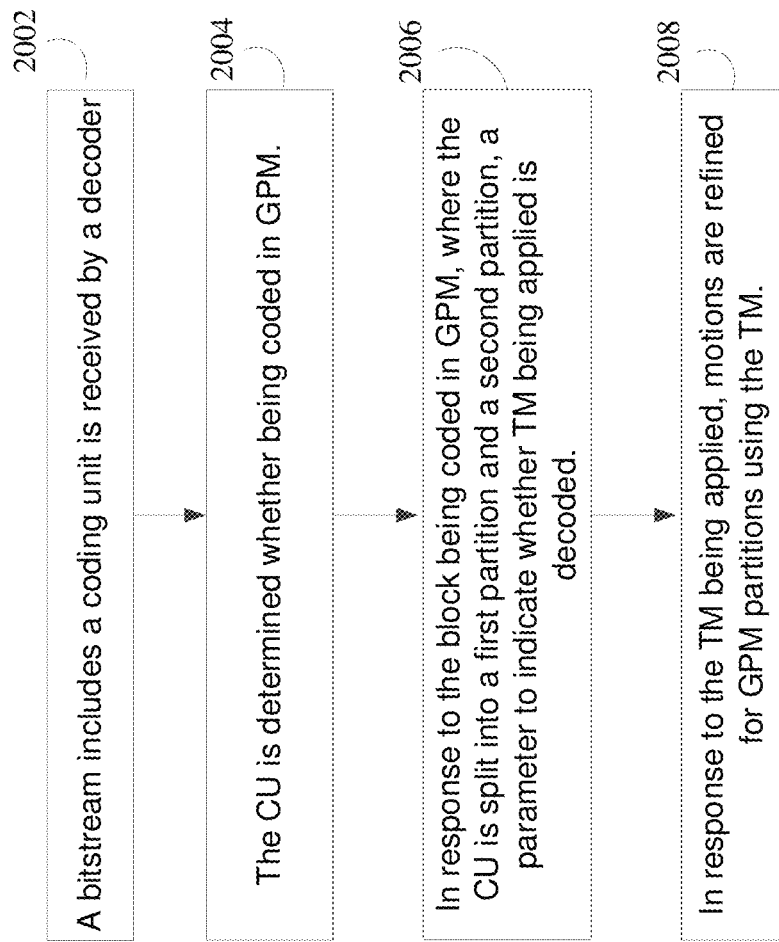
FIG. 20 illustrates another exemplary flow chart of a method for applying template matching to GPM to refine the motion, according to some embodiments of the present disclosure.

FIG. 20 illustrates another exemplary flow chart of a method 2000 for applying template matching to GPM to refine the motion, according to some embodiments of the present disclosure. Method 2000 can be performed as part of a video decoding process (e.g., process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2000. In some embodiments, method 2000 can be implemented by a computer program product, embodied in a computer-readable medium, including computer-executable instructions, such as program code, executed by computers (e.g., apparatus 400 of FIG. 4). Referring to FIG. 20, method 2000 may include the following steps 2002-2008.

In step 2002, a bitstream (e.g., video bitstream 228 in FIG. 3B) includes a coding unit is received by a decoder.

In step 2004, the CU is determined whether being coded in GPM.

In step 2006, in response to the block being coded in GPM, where the CU is split into a first partition and a second partition, a parameter (e.g., a flag) to indicate whether TM being applied is decoded. In some embodiments, the parameter can include a plurality of flags indicating whether TM being applied to each partition respectively (referring back to Table 4). In some embodiments, the parameter can include an index indicating combinations of the partitions being applied the TM (referring back to Table 5).

In step 2008, in response to the TM being applied, motions are refined for GPM partitions using the TM. If the TM is not applied to the CU, the motions are not refined. In some embodiments, if the TM is not applied to the CU, the motions can be refined using other method.

In this disclosure, methods of combining GPM with MMVD and TM are further provided.

In some embodiments, MMVD and TM cannot be applied to the same CU. When a CU coded using GPM, a first parameter (e.g., a first flag) is signaled to indicate whether TM is applied to the CU. When TM is applied, the GPM and two merge indices are further signaled. Then, both motions of the two GPM partitions are refined using TM. When TM is not applied to the CU, a second parameter is signaled to indicate whether MMVD is applied to the GPM partitions. When MMVD is applied to the GPM partitions, the MVD information is further signaled and the motion is refined using the signaled MVD information. In one example, the second parameter contains a second flag and a third flag. The second flag indicates whether MMVD is applied to the first GPM partition and the third flag indicates whether MMVD is applied to the second GPM partition. In another example, the second parameter only contains a fourth flag, wherein the fourth flag indicates whether MMVD is applied to both of the two GPM partitions.

In some embodiments, MMVD and TM cannot be applied to the same GPM partitions. When a CU is coded in GPM, the CU is split into two GPM partitions. For each GPM partition, a first parameter is signaled to indicate whether TM is applied to the GPM partition. When TM is applied, the motion of the GPM partition is refined using TM. When TM is not applied, a second parameter is signaled to indicate whether MMVD is applied to the GPM partition. It is noted that when the first parameter indicates that the TM is applied to the GPM partition, the second parameter is not signaled. It is also noted that the two GPM partitions can individually select whether to use TM or MMVD to refine motion. That is, the motion of one GPM partition can be refined using TM and the motion of the other GPM partition can be refined using MMVD.

Figure 21:
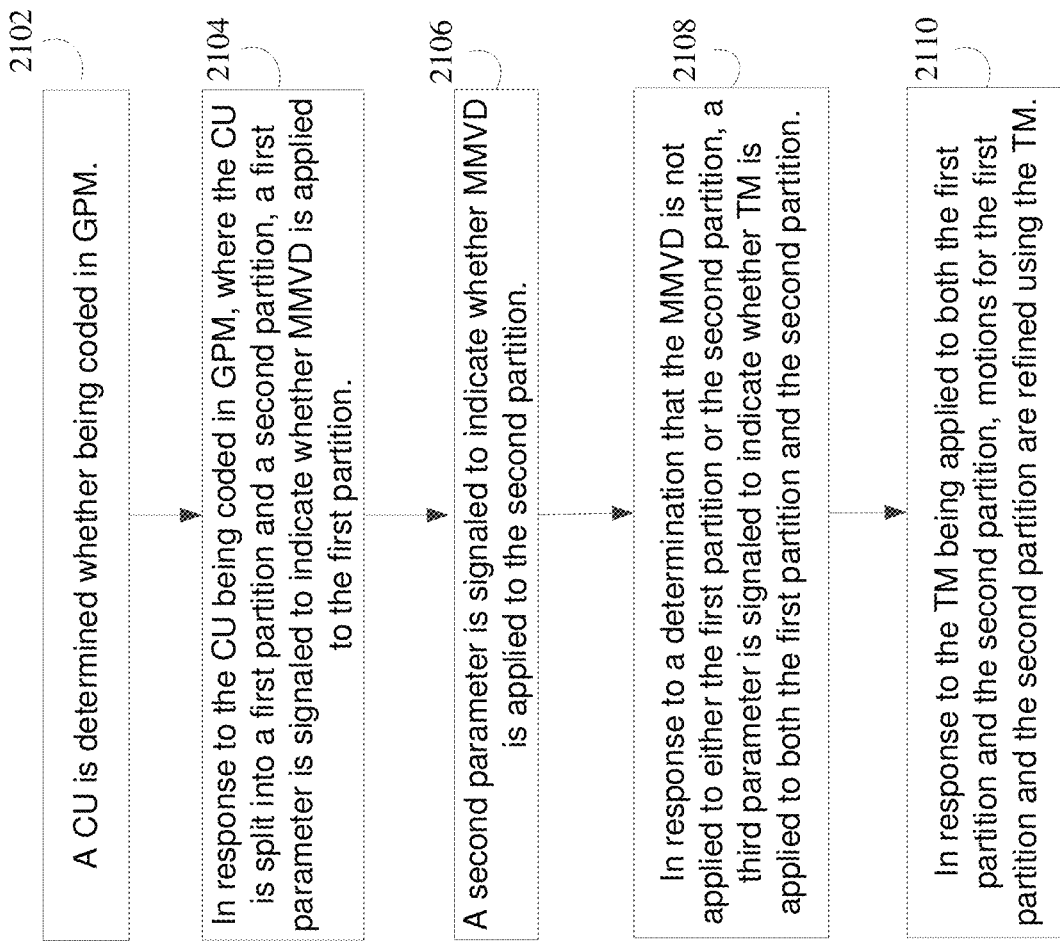
FIG. 21 illustrates an exemplary flow chart of a method for applying GPM, TM, and MMVD, according to some embodiments of the present disclosure.

In some embodiments, the signaling order of the two parameters (one for indicating whether TM is applied and another for indicating whether MMVD is applied) can be reordered. The parameter indicating whether MMVD being applied can be signaled prior to the parameter indicating whether TM being applied. When the parameter indicating whether MMVD is firstly signaled and MMVD is applied to the GPM partition, the parameter indicating whether TM being applied is not signaled anymore and is inferred to be off. Therefore, TM is not applied to the GPM partition. FIG. 21 illustrates an exemplary flow chart of a method 2100 for applying GPM, TM, and MMVD, according to some embodiments of the present disclosure. Method 2100 can be performed as part of a video encoding process (e.g., process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 2100. In some embodiments, method 2100 can be implemented by a computer program product, embodied in a computer-readable medium, including computer-executable instructions, such as program code, executed by computers (e.g., apparatus 400 of FIG. 4). Referring to FIG. 21, method 2100 may include the following steps 2102-2110.

In step 2102, a CU is determined whether being coded in GPM.

In step 2104, in response to the CU being coded in GPM, where the CU is split into a first partition and a second partition, a first parameter is signaled to indicate whether MMVD is applied to the first partition. For example, the first parameter can be a first flag. When the first flag is equal to 1, the MMVD is applied to the first partition. When the first flag is equal to 0, the MMVD is not applied to the first partition.

In step 2106, a second parameter is signaled to indicate whether MMVD is applied to the second partition. For example, the second parameter can be a second flag. When the second flag is equal to 1, the MMVD is applied to the second partition. When the second flag is equal to 0, the MMVD is not applied to the second partition.

In step 2108, in response to a determination that the MMVD is not applied to either the first partition or the second partition, a third parameter is signaled to indicate whether TM is applied to both the first partition and the second partition. For example, the third parameter can be a third flag. When the third flag is equal to 1, the TM is applied to both the partitions. When the third flag is equal to 0, the TM is not applied to either partition.

In step 2110, in response to the TM being applied to both the first partition and the second partition, motions for the first partition and the second partition are refined using the TM. Furthermore, in some embodiments, the template used for refining motion is determined according to a partition mode or a partition angle.

Figure 22:
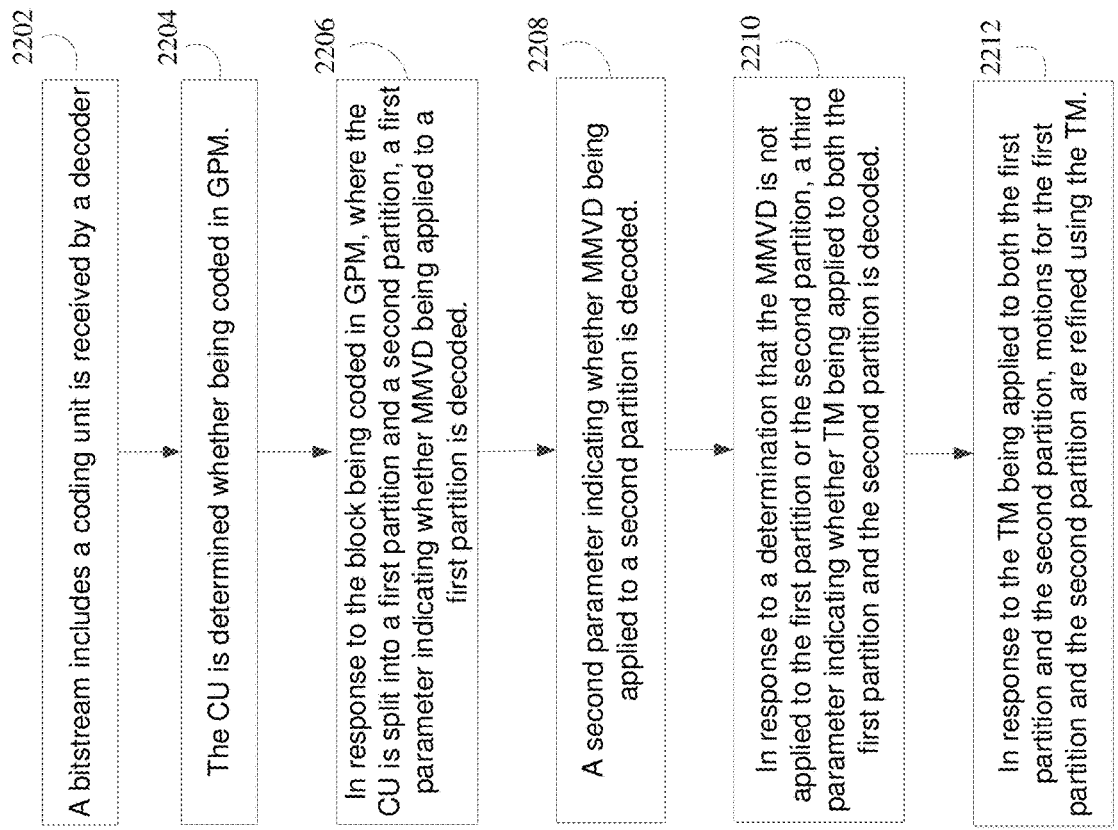
FIG. 22 illustrates an exemplary flow chart of a method for applying GPM, TM, and MMVD, according to some embodiments of the present disclosure.

FIG. 22 illustrates an exemplary flow chart of a method 2200 for applying GPM, TM, and MMVD, according to some embodiments of the present disclosure. Method 2100 can be performed as part of a video decoding process (e.g., process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 2200. In some embodiments, method 2200 can be implemented by a computer program product, embodied in a computer-readable medium, including computer-executable instructions, such as program code, executed by computers (e.g., apparatus 400 of FIG. 4). Referring to FIG. 22, method 2200 may include the following steps 2202-2212.

In step 2202, a bitstream (e.g., video bitstream 228 in FIG. 3B) includes a coding unit is received by a decoder.

In step 2204, the CU is determined whether being coded in GPM.

In step 2206, in response to the block being coded in GPM, where the CU is split into a first partition and a second partition, a first parameter indicating whether MMVD being applied to a first partition is decoded. For example, the first parameter can be a first flag, when the first flag is equal to 1, the MMVD is applied to the first partition; and when the first flag is equal to 0, the MMVD is not applied to the first partition.

In step 2208, a second parameter indicating whether MMVD being applied to a second partition is decoded. For example, the second parameter can be a second flag, when the second flag equals to 1, the MMVD is applied to the second partition; when the second flag equals to 0, the MMVD is not applied to the second partition.

In step 2210, in response to a determination that the MMVD is not applied to the first partition or the second partition, a third parameter indicating whether TM being applied to both the first partition and the second partition is decoded. For example, the third parameter can be a third flag, when the third flag equals to 1, the TM is applied to both partitions; when the third flag equals to 0, the TM is not applied to either partition.

In step 2210, in response to the TM being applied to both the first partition and the second partition, motions for the first partition and the second partition are refined using the TM. Furthermore, in some embodiments, the template used for refining motion is determined according to the partition mode or a partition angle. In some embodiments, the template used for refining motion is determined by decoding a plurality of parameters.

In some embodiments, MMVD and TM can be applied to the same GPM partition. For each GPM partition, a first parameter and a second parameter are signaled to indicate whether TM and MMVD are applied, respectively. In one example, when TM and MMVD are both applied to the GPM partition, the motion is firstly refined using TM. Then, the refined motion is further modified by adding the signaled MVD information. In another example, when TM and MMVD are both applied to the GPM partition, the motion is firstly added with the signaled MVD information. Then, the modified motion is used as a starting point of TM and is refined by TM.

In some embodiments, MMVD and TM can be applied to the same GPM partition only when the signaled MVD information satisfies a plurality of conditions. In one example, the plurality of conditions includes a distance index of the signaled MVD information being smaller than a predefined value (e.g., 1, that is the MVD offset is smaller than ½-pel). For each GPM partition, a second parameter is signaled to indicate whether MMVD is applied. When the MMVD is applied, MVD information including a distance index and a direction index is further signaled. When the distance index is smaller than a predefined value, a first parameter is signaled to indicate whether TM is applied. When the MMVD is not applied, the first parameter is always signaled to indicate whether TM is applied. In another example, the plurality of conditions includes the distance index of the signaled MVD information being larger than a predefined value.

In some embodiments, MMVD and TM can be applied to the same GPM partition only when the size/coding mode of a GPM coded CU satisfies some conditions. In one example, when a width and/or height of the CU is/are larger than a predefined threshold (e.g., 16 or 32), MMVD and TM can be both applied to the same GPM partition. In another example, when an aspect ratio of the CU is smaller than a predefined threshold, MMVD and TM can be both applied to the same GPM partition. The aspect ratio is defined as CU_width/CU_height if CU_width>CU_height or CU_height/CU_width if CU_height>=CU_width. In another example, when the CU is coded using merge mode but not skip mode, MMVD and TM can be both applied to the same GPM partition. In another example, when the CU is coded using skip mode but not merge mode, MMVD and TM can be both applied to the same GPM partition.

The embodiments may further be described using the following clauses:

1. A video decoding method, comprising:
    receiving a bitstream comprising a coding unit coded in a geometric partition mode (GPM);
    decoding a first parameter associated with the coding unit, the first parameter indicating whether template matching being applied to the coding unit; and
    determining, according to the first parameter, motion information for the coding unit, wherein when the first parameter indicates the template matching is applied to the coding unit, the motion information is refined using the template matching.

2. The method according to clause 1, wherein the coding unit is split into a first partition and a second partition, the motion information for the coding unit comprises a first motion of the first partition and a second motion of the second partition, the first parameter comprises a first flag, and the motion information is refined using the template matching further comprises:
    refining both the first motion of the first partition and the second motion of the second partition using the template matching according to the first flag.

3. The method according to clause 1, wherein the coding unit is split into a first partition and a second partition, the first parameter comprises a first flag indicating whether the template matching being applied to the first partition and a second flag indicating whether the template matching being applied to the seconding partition, and the refinement of the motion information further comprises:
    refining a first motion of the first partition using the template matching according to the first flag; and
    refining a second motion of the second partition using the template matching according to the second flag.

4. The method according to clause 1, wherein the coding unit is split into a first partition and a second partition, the first parameter comprises an index indicating whether the template matching being applied to the first partition and the second partition, and the refinement of the motion information further comprises:
    refining, according to a value of the index, a first motion of the first partition, a second motion of the second partition, or both the first motion of the first partition and the second motion of the second partition.

5. The method according to any one of clauses 1 to 4, wherein the coding unit is split into a first partition and a second partition, the motion information comprises a first motion of the first partition and a second motion of the second partition, and the motion information refinement further comprises:
constructing a first template for the first partition, the first template being constructed from a first set of neighboring samples;
constructing a second template for the second partition, the second template being constructed from a second set of neighboring samples; and
refining the first and second motions using the first and second templates, respectively,
wherein each of the first and second sets of neighboring samples comprises one or more neighboring samples selected from:
   left neighboring samples only,
   top neighboring samples only, or
   both the left neighboring samples and the top neighboring samples.

6. The method according to clause 5, wherein the first set of neighboring samples is selected based on availabilities of the left neighboring samples and the top neighboring samples of the first partition, and
the second set neighboring samples is selected based on availabilities of the left neighboring samples and the top neighboring samples of the second partition.

7. The method according to clause 5 or 6, further comprising:
constructing the first template and the second template based on a GPM partition mode.

8. The method according to clause 7, further comprising:
constructing the first template and the second template based on a GPM partition angle.

9. The method according to any one of clauses 5 to 8, further comprising:
decoding a second parameter associated with the first template,
decoding a third parameter associated with the second template,
wherein the second and third parameters indicate, respectively, whether the first and second sets of neighboring samples are selected from:
   the left neighboring samples only,
   the top neighboring samples only, or
   both the left neighboring samples and the top neighboring samples.

10. The method according to any one of clauses 5 to 9, wherein the first set of neighboring samples is different from the second set of neighboring samples.

11. The method according to any one of clauses 5 to 9, wherein the first set of neighboring samples is same as the second set of neighboring samples.

12. The method according to any one of clauses 1 to 11, further comprising:
performing motion compensation using the refined motion; and
applying a blending process along a geometric partitioning edge according to a GPM partition mode.

13. The method according to any one of clauses 1 to 12, further comprising:
in response to the template matching not being applied to the coding unit, decoding a second parameter indicating whether merge mode with motion vector differences (MMVD) being applied;
in response to the MMVD being applied, decoding motion vector differences (MVD) information; and
refining the motions using the MVD information.

14. The method according to clause 13, wherein the second parameter comprises a first flag indicating whether the MMVD being applied to the first partition, and a second flag indicating whether the MMVD being applied to the second partition.

15. The method according to any one of clauses 1 to 12, wherein the coding unit is split into a first partition and a second partition, and the method further comprises:
decoding a second parameter indicating whether MMVD being applied to the first partition;
decoding a third parameter indicating whether the MMVD being applied to the second partition;
in response to the MMVD not being applied to the first partition or the second partition, determining, according to the first parameter, whether the template matching is applied to both the first partition and the second partition; and
in response to the templating matching being applied to the both the first partition and the second partition, refining motion information for the first partition and the second partition using the template matching.

16. The method according to clause 15, wherein a template used for refining motion is determined based on a partition mode.

17. An apparatus for performing video data processing, the apparatus comprising:
a memory figured to store instructions; and
one or more processors configured to execute the instructions to cause the apparatus to perform:
   receiving a bitstream comprising a coding unit coded in a geometric partition mode (GPM);
   decoding a first parameter associated with the coding unit, the first parameter indicating whether template matching being applied to the coding unit; and
   determining, according to the first parameter, motion information for the coding unit, wherein when the first parameter indicates the template matching is applied to the coding unit, the motion information is refined using the template matching.

18. The apparatus according to clause 17, wherein the coding unit is split into a first partition and a second partition, the motion information for the coding unit comprises a first motion of the first partition and a second motion of the second partition, the first parameter comprises a first flag, and the processor is further configured to execute the instructions to cause the apparatus to perform:
refining both the first motion of the first partition and the second motion of the second partition using the template matching according to the first flag.

19. The apparatus according to clause 17, wherein the coding unit is split into a first partition and a second partition, the first parameter comprises a first flag indicating whether the template matching being applied to the first partition and a second flag indicating whether the template matching being applied to the seconding partition, and the processor is further configured to execute the instructions to cause the apparatus to perform:
refining a first motion of the first partition using the template matching according to the first flag; and
refining a second motion of the second partition using the template matching according to the second flag.

20. The apparatus according to clause 17, wherein the coding unit is split into a first partition and a second partition, the first parameter comprises an index indicating whether the template matching being applied to the first partition and the second partition, and the processor is further configured to execute the instructions to cause the apparatus to perform:

refining, according to a value of the index, a first motion of the first partition, a second motion of the second partition, or both the first motion of the first partition and the second motion of the second partition.

21. The apparatus according to any one of clauses 17 to 20, wherein the coding unit is split into a first partition and a second partition, the motion information comprises a first motion of the first partition and a second motion of the second partition, and the processor is further configured to execute the instructions to cause the apparatus to perform:

constructing a first template for the first partition, the first template being constructed from a first set of neighboring samples;

constructing a second template for the second partition, the second template being constructed from a second set of neighboring samples; and refining the first and second motions using the first and second templates, respectively, wherein each of the first and second sets of neighboring samples comprises one or more neighboring samples selected from:
  left neighboring samples only,
  top neighboring samples only, or
  both the left neighboring samples and the top neighboring samples.

22. The apparatus according to clause 21, wherein the first set of neighboring samples is selected based on availabilities of the left neighboring samples and the top neighboring samples of the first partition, and the second set neighboring samples is selected based on availabilities of the left neighboring samples and the top neighboring samples of the second partition.

23. The apparatus according to clause 21 or 22, wherein the processor is further configured to execute the instructions to cause the apparatus to perform:

constructing the first template and the second template based on a GPM partition mode.

24. The apparatus according to clause 23, wherein the processor is further configured to execute the instructions to cause the apparatus to perform:

constructing the first template and the second template based on a GPM partition angle.

25. The apparatus according to any one of clauses 21 to 24, wherein the processor is further configured to execute the instructions to cause the apparatus to perform:

decoding a second parameter associated with the first template, decoding a third parameter associated with the second template, wherein the second and third parameters indicate, respectively, whether the first and second sets of neighboring samples are selected from:
  the left neighboring samples only,
  the top neighboring samples only, or
  both the left neighboring samples and the top neighboring samples.

26. The apparatus according to any one of clauses 21 to 25, wherein the first set of neighboring samples is different from the second set of neighboring samples.

27. The apparatus according to any one of clauses 21 to 25, wherein the first set of neighboring samples is same as the second set of neighboring samples.

28. The apparatus according to any one of clauses 17 to 27, wherein the processor is further configured to execute the instructions to cause the apparatus to perform:

performing motion compensation using the refined motion; and applying a blending process along a geometric partitioning edge according to a GPM partition mode.

29. The apparatus according to any one clauses 17 to 28, wherein the processor is further configured to execute the instructions to cause the apparatus to perform:

in response to the template matching not being applied to the coding unit, decoding a second parameter indicating whether merge mode with motion vector differences (MMVD) being applied;

in response to the MMVD being applied, decoding motion vector differences (MVD) information; and refining the motions using the MVD information.

30. The apparatus according to clause 29, wherein the second parameter comprises a first flag indicating whether the MMVD being applied to the first partition, and a second flag indicating whether the MMVD being applied to the second partition.

31. The apparatus according to any one of clauses 17 to 28, wherein the coding unit is split into a first partition and a second partition, and the processor is further configured to execute the instructions to cause the apparatus to perform:

decoding a second parameter indicating whether MMVD being applied to the first partition;

decoding a third parameter indicating whether the MMVD being applied to the second partition;

in response to the MMVD not being applied to the first partition or the second partition, determining, according to the first parameter, whether the template matching is applied to both the first partition and the second partition; and in response to the templating matching being applied to the both the first partition and the second partition, refining motion information for the first partition and the second partition using the template matching.

32. The apparatus according to clause 31, wherein a template used for refining motion is determined based on a partition mode.

33. A non-transitory computer readable medium that stores a set of instructions that is executable by one or more processors of an apparatus to cause the apparatus to initiate a method for performing video data processing, the method comprising:

receiving a bitstream comprising a coding unit coded in a geometric partition mode (GPM);

decoding a first parameter associated with the coding unit, the first parameter indicating whether template matching being applied to the coding unit; and determining, according to the first parameter, motion information for the coding unit, wherein when the first parameter indicates the template matching is applied to the coding unit, the motion information is refined using the template matching.

34. The non-transitory computer readable medium according to clause 33, wherein the coding unit is split into a first partition and a second partition, the motion information for the coding unit comprises a first motion of the first partition and a second motion of the second partition, the first parameter comprises a first flag, and the set of instructions that is executable by one or more processors of an apparatus to cause the apparatus to further perform:

refining both the first motion of the first partition and the second motion of the second partition using the template matching according to the first flag.

35. The non-transitory computer readable medium according to clause 33, wherein the coding unit is split into a first partition and a second partition, the first parameter comprises a first flag indicating whether the template matching being applied to the first partition and a second flag indicating whether the template matching being applied to the seconding partition, and the set of instructions that is executable by one or more processors of an apparatus to cause the apparatus to further perform:
   refining a first motion of the first partition using the template matching according to the first flag; and
   refining a second motion of the second partition using the template matching according to the second flag.

36. The non-transitory computer readable medium according to clause 33, wherein the coding unit is split into a first partition and a second partition, the first parameter comprises an index indicating whether the template matching being applied to the first partition and the second partition, and the set of instructions that is executable by one or more processors of an apparatus to cause the apparatus to further perform:
   refining, according to a value of the index, a first motion of the first partition, a second motion of the second partition, or both the first motion of the first partition and the second motion of the second partition.

37. The non-transitory computer readable medium according to any one of clauses 33 to 36, wherein the coding unit is split into a first partition and a second partition, the motion information comprises a first motion of the first partition and a second motion of the second partition, and the set of instructions that is executable by one or more processors of an apparatus to cause the apparatus to further perform:
constructing a first template for the first partition, the first template being constructed from a first set of neighboring samples;
constructing a second template for the second partition, the second template being constructed from a second set of neighboring samples; and
refining the first and second motions using the first and second templates, respectively,
wherein each of the first and second sets of neighboring samples comprises one or more neighboring samples selected from:
   left neighboring samples only,
   top neighboring samples only, or
   both the left neighboring samples and the top neighboring samples.

38. The non-transitory computer readable medium according to clause 37, wherein the first set of neighboring samples is selected based on availabilities of the left neighboring samples and the top neighboring samples of the first partition, and the second set neighboring samples is selected based on availabilities of the left neighboring samples and the top neighboring samples of the second partition.

39. The non-transitory computer readable medium according to clause 37 or 38, wherein the set of instructions that is executable by one or more processors of an apparatus to cause the apparatus to further perform:
constructing the first template and the second template based on a GPM partition mode.

40. The non-transitory computer readable medium according to clause 39, wherein the set of instructions that is executable by one or more processors of an apparatus to cause the apparatus to further perform:
constructing the first template and the second template based on a GPM partition angle.

41. The non-transitory computer readable medium according to any one of clauses 37 to wherein the set of instructions that is executable by one or more processors of an apparatus to cause the apparatus to further perform:
decoding a second parameter associated with the first template,
decoding a third parameter associated with the second template,
wherein the second and third parameters indicate, respectively, whether the first and second sets of neighboring samples are selected from:
   the left neighboring samples only,
   the top neighboring samples only, or
   both the left neighboring samples and the top neighboring samples.

42. The non-transitory computer readable medium according to any one of clauses 37 to 41, wherein the first set of neighboring samples is different from the second set of neighboring samples.

43. The non-transitory computer readable medium according to any one of clauses 37 to 41, wherein the first set of neighboring samples is same as the second set of neighboring samples.

44. The non-transitory computer readable medium according to any one of clauses 33 to 43, wherein the set of instructions that is executable by one or more processors of an apparatus to cause the apparatus to further perform:
performing motion compensation using the refined motion; and
applying a blending process along a geometric partitioning edge according to a GPM partition mode.

45. The non-transitory computer readable medium according to any one of clauses 33 to 44, wherein the set of instructions that is executable by one or more processors of an apparatus to cause the apparatus to further perform:
in response to the template matching not being applied to the coding unit, decoding a second parameter indicating whether merge mode with motion vector differences (MMVD) being applied;
in response to the MMVD being applied, decoding motion vector differences (MVD) information; and
refining the motions using the MVD information.

46. The non-transitory computer readable medium according to clause 45, wherein the second parameter comprises a first flag indicating whether the MMVD being applied to the first partition, and a second flag indicating whether the MMVD being applied to the second partition.

47. The non-transitory computer readable medium according to any one of clauses 33 to 44, wherein the coding unit is split into a first partition and a second partition, and the set of instructions that is executable by one or more processors of an apparatus to cause the apparatus to further perform:

decoding a second parameter indicating whether MMVD being applied to the first partition;

decoding a third parameter indicating whether the MMVD being applied to the second partition;

in response to the MMVD not being applied to the first partition or the second partition, determining, according to the first parameter, whether the template matching is applied to both the first partition and the second partition; and in response to the templating matching being applied to the both the first partition and the second partition, refining motion information for the first partition and the second partition using the template matching.

48. The non-transitory computer readable medium according to clause 47, wherein a template used for refining motion is determined based on a partition mode.

49. A non-transitory computer readable medium storing a bitstream, wherein the bitstream comprises:

a first parameter associated with a coding unit, the first parameter indicating whether template matching being applied, wherein the coding unit is coded in a geometric partition mode (GPM).

50. The non-transitory computer readable medium according to clause 49, wherein the coding unit is split into a first partition and a second partition, and the first parameter further comprises:

a first flag indicating whether the template matching being applied to the first partition; and a second flag indicating whether the template matching being applied to the second partition.

51. The non-transitory computer readable medium according to clause 49, wherein the bitstream further comprises:

a second parameter associated with the coding unit, the second parameter indicating a template for the template matching, wherein the template is constructed from one or more neighboring samples selected from:

left neighboring samples only, top neighboring samples only, or both the left neighboring samples and the top neighboring samples.

52. The non-transitory computer readable medium according to clause 49, wherein the bitstream further comprises:

a second parameter associated with the coding unit, the second parameter indicating whether merge mode with motion vector differences (MMVD) being applied.

53. The non-transitory computer readable medium according to clause 49, wherein the coding unit is split into a first partition and a second partition, and the bitstream further comprises:

a second parameter associated with the coding unit, the second parameter indicating whether merge mode with motion vector differences (MMVD) being applied to the first partition; and a third parameter associated with video data, the third parameter indicating whether the MMVD being applied to the second partition.

In some embodiments, a non-transitory computer-readable storage medium including instructions is also provided.

In some embodiments, the medium can store all or portions of the video bitstream having one or more flags that indicate the GPM, TM, or MMVD being applied to a CU or to a partition. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video decoding method, comprising:
receiving a bitstream comprising a coding unit coded in a geometric partition mode (GPM);
constructing a template for the coding unit based on a GPM partition angle; and
refining motion information of the coding unit using template matching.

2. The method according to claim 1, wherein the coding unit is split into a first partition and a second partition, the motion information comprises a first motion of the first partition and a second motion of the second partition, and the motion information refinement further comprises:
constructing a first template for the first partition;
constructing a second template for the second partition; and
refining the first motion and the second motion using the first templates and the second template, respectively, wherein the first template and the second template are constructed based on a GPM partition angle.

3. The method according to claim 2, wherein the first template is constructed from a first set of neighboring samples and the second template is constructed from a second set of neighboring samples, each of the first and second sets of neighboring samples comprising one or more neighboring samples selected from:
left neighboring samples only,
top neighboring samples only, or
both the left neighboring samples and the top neighboring samples.

4. The method according to claim 3, wherein the first set of neighboring samples is selected based on availabilities of the left neighboring samples and the top neighboring samples of the first partition, and
the second set neighboring samples is selected based on availabilities of the left neighboring samples and the top neighboring samples of the second partition.

5. The method according to claim 3, further comprising:
decoding a first parameter associated with the first template,
decoding a second parameter associated with the second template,
wherein the first and second parameters indicate, respectively, whether the first and second sets of neighboring samples are selected from:
the left neighboring samples only,
the top neighboring samples only, or
both the left neighboring samples and the top neighboring samples.

6. A video encoding method, comprising:
receiving a video sequence;
coding a coding unit of the video sequence in a geometric partition mode (GPM);
constructing a template for the coding unit based on a GPM partition angle; and
refining motion information of the coding unit using template matching.

7. The method according to claim 6, wherein the coding unit is split into a first partition and a second partition, the motion information comprises a first motion of the first partition and a second motion of the second partition, and the motion information refinement further comprises:
constructing a first template for the first partition;
constructing a second template for the second partition; and
refining the first motion and the second motion using the first templates and the second template, respectively, wherein the first template and the second template are constructed based on a GPM partition angle.

8. The method according to claim 7, wherein the first template is constructed from a first set of neighboring samples and the second template is constructed from a second set of neighboring samples, each of the first and second sets of neighboring samples comprising one or more neighboring samples selected from:
left neighboring samples only,
top neighboring samples only, or
both the left neighboring samples and the top neighboring samples.

9. The method according to claim 8, wherein the first set of neighboring samples is selected based on availabilities of the left neighboring samples and the top neighboring samples of the first partition, and
the second set neighboring samples is selected based on availabilities of the left neighboring samples and the top neighboring samples of the second partition.

10. The method according to claim 8, further comprising:
signaling a first parameter associated with the first template,
signaling a second parameter associated with the second template,
wherein the first and second parameters indicate, respectively, whether the first and second sets of neighboring samples are selected from:
the left neighboring samples only,
the top neighboring samples only, or
both the left neighboring samples and the top neighboring samples.

11. A non-transitory computer readable storage medium storing a bitstream of a video for processing according to a method, wherein the bitstream comprises a coding unit coded in a geometric partition mode (GPM) and the method comprises:
constructing a template for the coding unit based on a GPM partition angle; and
refining motion information of the coding unit using template matching.

12. The non-transitory computer readable storage medium according to claim 11, wherein the coding unit is split into a first partition and a second partition, the motion information comprises a first motion of the first partition and a second motion of the second partition, and the motion information refinement further comprises:
constructing a first template for the first partition;
constructing a second template for the second partition; and
refining the first motion and the second motion using the first templates and the second template, respectively, wherein the first template and the second template are constructed based on a GPM partition angle.

13. The non-transitory computer readable storage medium according to claim 12, wherein the first template is constructed from a first set of neighboring samples and the second template is constructed from a second set of neighboring samples, each of the first and second sets of neighboring samples comprising one or more neighboring samples selected from:

left neighboring samples only,
top neighboring samples only, or
both the left neighboring samples and the top neighboring samples.

14. The non-transitory computer readable storage medium according to claim 13, wherein the first set of neighboring samples is selected based on availabilities of the left neighboring samples and the top neighboring samples of the first partition, and the second set neighboring samples is selected based on availabilities of the left neighboring samples and the top neighboring samples of the second partition.

* * * * *